US010977764B2

(12) United States Patent
Kunkel et al.

(10) Patent No.: US 10,977,764 B2
(45) Date of Patent: Apr. 13, 2021

(54) VIEWPORT INDEPENDENT IMAGE CODING AND RENDERING

(71) Applicant: Dolby Laboratories Licensing Corporation, San Francisco, CA (US)

(72) Inventors: Timo Kunkel, Kensington, CA (US); Cristina Michel Vasco, San Francisco, CA (US); Scott Daly, Kalama, WA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 4 days.

(21) Appl. No.: 16/063,653

(22) PCT Filed: Dec. 22, 2016

(86) PCT No.: PCT/US2016/068221
§ 371 (c)(1),
(2) Date: Jun. 18, 2018

(87) PCT Pub. No.: WO2017/116952
PCT Pub. Date: Jul. 6, 2017

(65) Prior Publication Data
US 2018/0374192 A1 Dec. 27, 2018

Related U.S. Application Data

(60) Provisional application No. 62/272,284, filed on Dec. 29, 2015.

(30) Foreign Application Priority Data

Feb. 23, 2016 (EP) .................................... 16156873

(51) Int. Cl.
*G06T 3/00* (2006.01)
*H04N 5/232* (2006.01)
(Continued)

(52) U.S. Cl.
CPC .............. *G06T 3/0062* (2013.01); *G06F 3/14* (2013.01); *G06T 3/0087* (2013.01);
(Continued)

(58) Field of Classification Search
CPC ... G06T 3/0062; G06T 3/0087; G06T 3/4038; G06T 15/205; H04N 5/2259;
(Continued)

(56) References Cited

U.S. PATENT DOCUMENTS 5,537,253 A 7/1996 Cox
5,675,746 A 10/1997 Marshall
(Continued)

FOREIGN PATENT DOCUMENTS

WO 1997/001241 1/1997

OTHER PUBLICATIONS

SMPTE ST 2084:2014 "High Dynamic Range Electro-Optical Transfer Function of Mastering Reference Displays" Aug. 16, 2014.
(Continued)

*Primary Examiner* — Ali Bayat

(57) ABSTRACT

A spherical image of a spatial environment is received and contains spherically arranged pixel values indexed by a time value. The spherical image is represented in a content creation coordinate system in reference to a spatial position in the spatial environment. The spatial position is indexed by the time value. A spatial relationship is determined between the content creation coordinate system and a spherical image reference coordinate system. Based at least in part on the spatial relationship and the spherically arranged pixel values, spherical distributions of image metadata are determined for the spherical image.

19 Claims, 21 Drawing Sheets

(51) Int. Cl.
G06F 3/14 (2006.01)
H04N 5/247 (2006.01)
G06T 15/20 (2011.01)
G06T 3/40 (2006.01)
H04N 5/225 (2006.01)

(52) U.S. Cl.
CPC .......... *G06T 3/4038* (2013.01); *G06T 15/205* (2013.01); *H04N 5/2259* (2013.01); *H04N 5/232* (2013.01); *H04N 5/23238* (2013.01); *H04N 5/247* (2013.01); *G09G 2352/00* (2013.01)

(58) Field of Classification Search
CPC .......... H04N 5/232; H04N 5/247; G06F 3/14; G06F 3/013; G06F 3/017; G06F 3/011; G02B 27/17; G02B 2207/0178
USPC ........................................ 382/284
See application file for complete search history.

(56) References Cited

U.S. PATENT DOCUMENTS

| | | | |
|---|---|---|---|
| 6,529,331 B2 | 3/2003 | Massof | |
| 6,707,500 B1 | 3/2004 | Tamura | |
| 6,925,122 B2 | 8/2005 | Gorodnichy | |
| 7,176,960 B1 | 2/2007 | Nayar | |
| 7,221,866 B2 | 5/2007 | Clemens | |
| 8,963,916 B2 | 2/2015 | Reitan | |
| 2002/0063711 A1* | 5/2002 | Park | H04N 5/232 345/428 |
| 2002/0075258 A1* | 6/2002 | Park | H04N 5/232 345/419 |
| 2007/0070069 A1 | 3/2007 | Samarasekera | |
| 2007/0253704 A1 | 11/2007 | Clemens | |
| 2010/0110069 A1 | 5/2010 | Yuan | |
| 2012/0206485 A1* | 8/2012 | Osterhout | G02B 27/0093 345/633 |
| 2012/0235886 A1* | 9/2012 | Border | G02B 27/0093 345/8 |
| 2012/0242798 A1 | 9/2012 | McArdle | |
| 2013/0050260 A1 | 2/2013 | Reitan | |
| 2013/0100132 A1 | 4/2013 | Katayama | |
| 2013/0278631 A1* | 10/2013 | Border | G06F 3/04842 345/633 |
| 2014/0267418 A1 | 9/2014 | McArdle | |
| 2014/0340427 A1 | 11/2014 | Baker | |
| 2015/0002374 A1 | 1/2015 | Erinjippurath | |
| 2015/0016686 A1 | 1/2015 | Kitamura | |
| 2015/0207991 A1* | 7/2015 | Steuart, III | G03B 35/08 348/187 |

OTHER PUBLICATIONS

Debevec, Paul "A Median Cut Algorithm for Light Probe Sampling" Technical Report 67, USC Institute for Creative Technologies 2005.

* cited by examiner

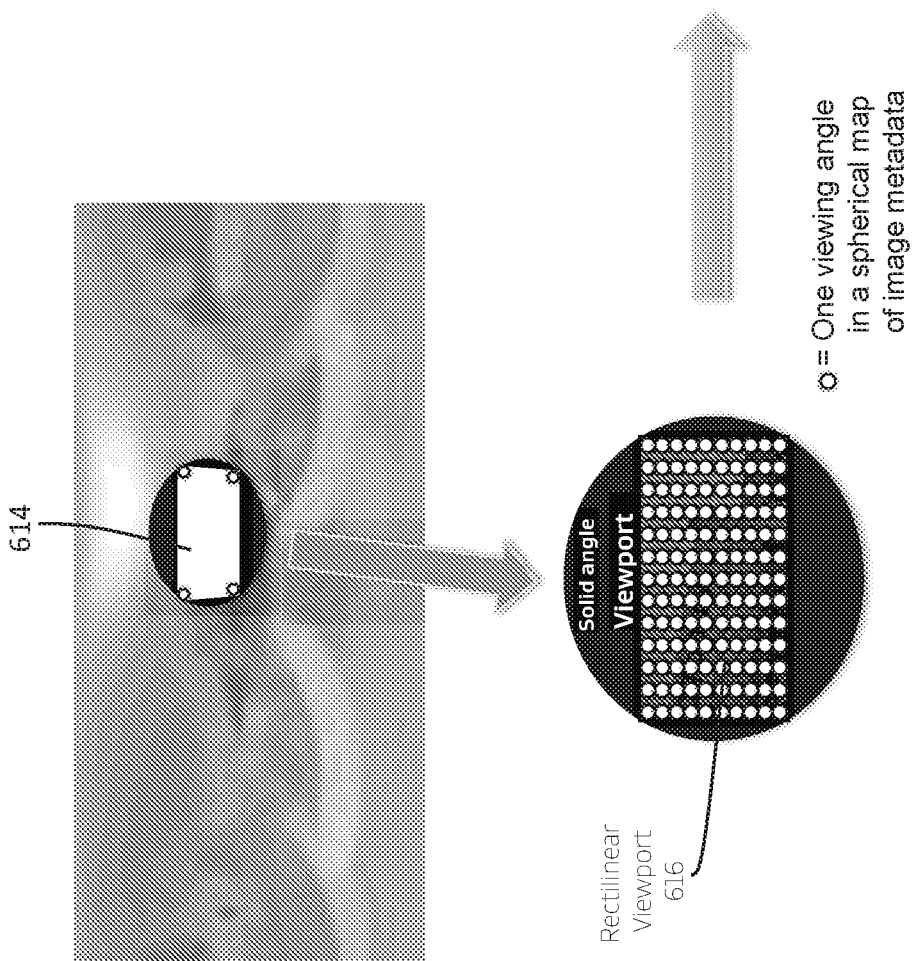

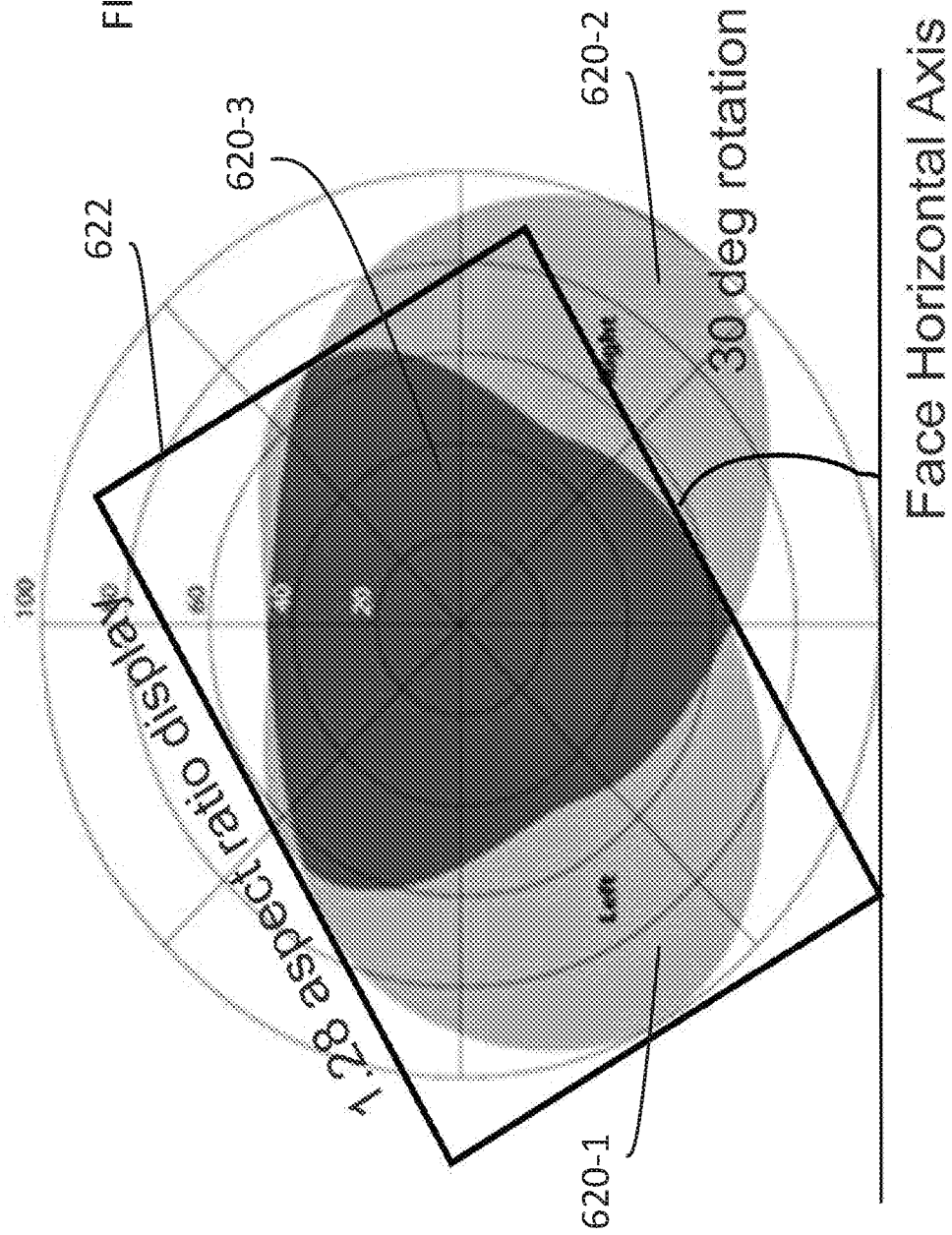

VIEWPORT INDEPENDENT IMAGE CODING AND RENDERING

CROSS-REFERENCE TO RELATED APPLICATIONS

This application claims the benefit of the U.S. Provisional Patent Application No. 62/272,284, filed Dec. 29, 2015; and also claims priority to European Patent Application No. 16156873.8, filed Feb. 23, 2016, the entire contents of which are incorporated by reference in their entirety.

TECHNOLOGY

The present invention relates generally to vision devices, and in particular, to viewport independent image coding and rendering.

BACKGROUND

Panorama images can cover a relatively large range of field of views (FOVs) with a wide set of view angles to a physical or artificial environment portrayed by the panorama images. Image portions extracted from the panorama images related to specific view angles can be rendered on image display devices of a wide variety of sizes, shapes, geometries, aspect ratios, etc. Small image portions can be extracted from the panorama images for rendering on relatively small image display areas of handheld devices. Large image portions can be extracted from the same panorama images for rendering on relatively large image display areas of panorama display systems, large televisions, wall-and-ceiling display systems, display systems for Cave Automatic Virtual Environments (CAVEs), etc.

Panorama images can be generated with a relatively high dynamic range. Images display devices, however, may support different dynamic ranges, typically lower. Handset devices may only support lower dynamic ranges much lower than a standard dynamic range, whereas high-end televisions may support high dynamic ranges much higher than the standard dynamic range such as ITU BT Rec.709 with approx. 100 cd/m2 max luminance. Merely extracting image portions extracted from the panorama images of the high dynamic range into the standard dynamic range would fail to take advantage of full rendering capabilities of many high-end televisions. In addition, for almost all display devices, visual artifacts are likely to occur if the image portions extracted from the panorama images are not properly adapted for rendering in accordance with specific rendering capabilities of these display devices.

The viewports of panorama images may change statically or dynamically in various vision applications. For movies, viewports may be selected based on a director's artistic intent. For virtual reality, augmented reality, helmet mounted display applications, etc., viewports may be changed dynamically based on head tracking. In different fields of view to the same image or to similar images, there may exist very different image content characteristics in terms of luminance range, color gamut, white point, etc. Rendering quality is likely to be negatively affected if the differences in the image characteristics of the image portions corresponding to the different fields of view are not properly addressed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 6E illustrates example applications related to a head-mounted display;

FIG. 6C illustrates an example determination of an image metadata vector for a viewport image of a spherical image by looking up in a spherical map of image metadata;

DESCRIPTION OF EXAMPLE EMBODIMENTS

Figure 1A:
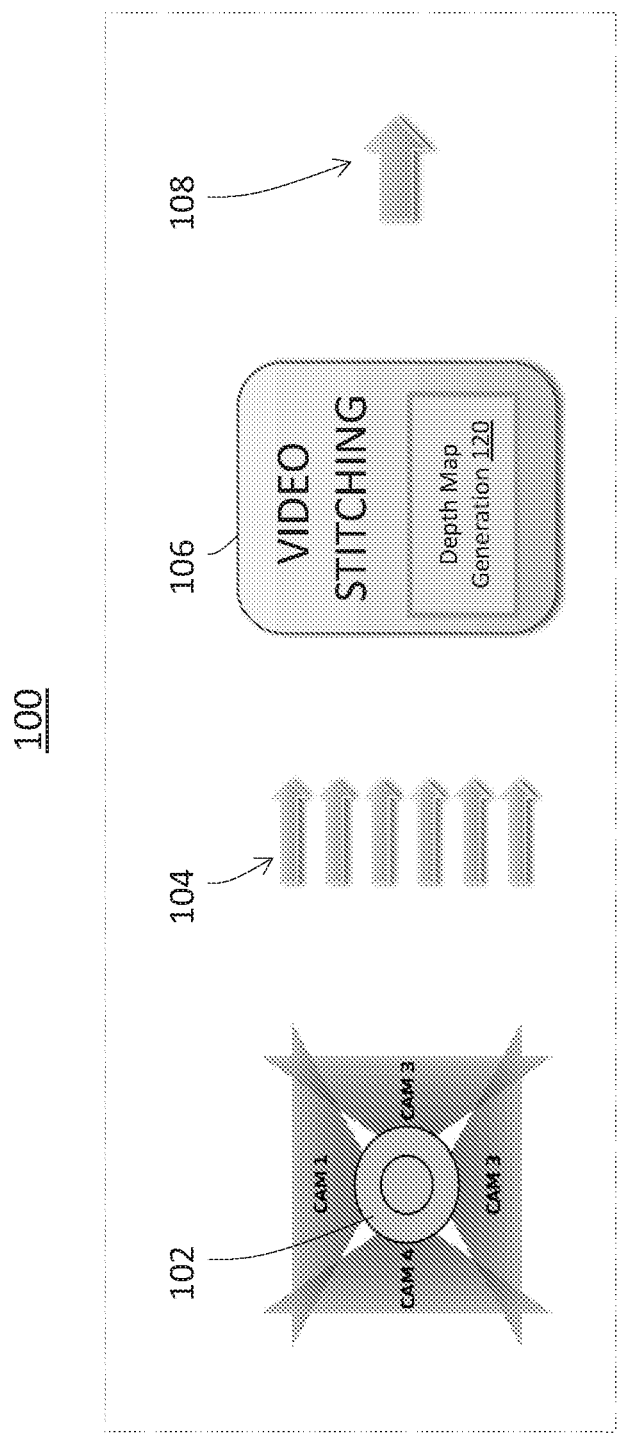
FIG. 1A illustrates an example image content creation system.

Example embodiments, which relate to viewport independent image coding and rendering, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
 1. GENERAL OVERVIEW
 2. IMAGE CONTENT CREATION
 3. VIEWPORTS 4. SPHERICAL MAPS OF IMAGE METADATA
5. SPHERICAL SURFACE FILTERS AND FILTER KERNELS
6. SPATIAL SHIFTS IN SPHERICAL IMAGES AND VIEWPORTS
7. GENERATING SPHERICAL MAPS FOR IMAGES WITH SPATIAL SHIFTS
8. GENERATING IMAGE METADATA VALUES FOR CHANGING VIEWPORTS
9. TEMPORAL DAMPENING
10. IMAGE PROCESSING AND IMAGE RENDERING
11. EXAMPLE PROCESS FLOWS
12. IMPLEMENTATION MECHANISMS—HARDWARE OVERVIEW
13. EQUIVALENTS, EXTENSIONS, ALTERNATIVES AND MISCELLANEOUS 1. General Overview This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used to generate (e.g., extract, store, etc.) spatial distributions of image metadata related to panorama images (e.g., multi-camera imagery, spherical images, panorama video used in virtual reality, etc.). The spatial distributions of image metadata can be used to support rendering image portions of the panorama images optimally on a wide variety of image display devices with disparate rendering capabilities (e.g., dynamic ranges, sizes, shapes, geometries, aspect ratios, etc.).

Panorama images and/or spherical distributions of image metadata associated with panorama images can be in a variety of spatial representations. Examples of spatial representations may include, but are not limited to only, any of: spheres, globular objects, geoids, equirectangular or any other projections of spheres or globular objects, cubic surfaces, shapes in two-dimensional (2D) spaces, shapes in three-dimensional (3D) spaces, etc. In the following, 'spherical' can mean any 3D shape that approximates a sphere, ellipsoid, globular object, geoid, etc.

For example, a panorama image may be represented as spherical images in a sphere (e.g., a whole sphere, a half sphere, a part sphere, a unit sphere, a fixed-radius sphere, etc.), an equirectangular projection (e.g., a whole equirectangular projection, a half equirectangular projection, a part equirectangular projection, etc.) of a sphere, etc. Additionally, optionally, or alternatively, any other projection to represent a sphere or geoid on a 2D plane can be used, such as and not limited by Mercator, Mollweide, Hammer, Sinusoidal, etc. Additionally, optionally, or alternatively, a spatial distribution of image metadata generated for one or more panorama images (e.g., spherical images, multi-camera imagery, spherical images, panorama video used in virtual reality, etc.) may be represented as spherical map of image metadata in a sphere (e.g., a whole sphere, a half sphere, a part sphere, a unit sphere, a fixed-radius sphere, etc.), an equirectangular projection (e.g., a whole equirectangular projection, a half equirectangular projection, a part equirectangular projection, etc.) of a sphere, etc.

Examples of image metadata whose spatial distributions may be captured/represented in spherical maps as described herein may include, but are not limited to only, any of: scalar values, vector values, matrix values, content mapping parameters, color mapping parameters, tone mapping parameters, prediction related parameters, lifts, gains, and gamma values in transfer functions, filter kernels, histograms of image codewords, statistical values of image codewords, luminance values, chroma values, primary color values, white point values, saliency maps, regions of interest (ROI), depth maps, spatial resolutions, light field maps, frame rates, movements, motion vectors, mappings between one of a perceptually quantized space and a linearly quantized space and another of one of a perceptually quantized space and a linearly quantized space, etc.

By way of example but not limitation, spherical maps of image metadata may be generated by applying spherical surface filters to a spherical image (which may or may not represent a full sphere, may or may not represent a perfect sphere, etc.). More specifically, the spherical surface filters may be (e.g., spherically) convolved with the spherical image by moving filter kernels of the spherical surface filters over latitudes and longitude positions in the spherical image to derive the spherical maps of image metadata as filtered values of the spherical image. In non-limiting implementation examples, the filter kernels may use circular spherical areas of constant areas (or constant solid angles) on a sphere represented as a 3D surface (or a surface in a 3D space). Additionally, optionally, or alternatively, the filter kernels may use approximate elliptical areas of varying areas on an equirectangular projection (of a sphere) represented in a 2D space, where the approximate elliptical areas for the filter kernels may vary based on a distance to the equator line of the equirectangular projection.

Spherical maps of image metadata as described herein can be used to support a wide variety of image processing operations related to including, but not limited necessarily to only, any of: display management, content mapping, tone mapping, color mapping, field-of-view management, prediction, motion detection, image rotation determination, image alignment analysis, scene cut detections, transformation between coordinate systems, temporal dampening or temporal low-pass filtering of excessive image brightness changes, generation of additional filter kernels, time-varying image parameters, etc. For example, a spherical map of image metadata, as generated by a specific spherical surface filter (e.g., luminance value filters, etc.), can be used for display management operations in rendering viewport images.

A viewport as described herein refers to a spatial shape (e.g., a cut-out, etc.) within a spherical image used to crop out or extract, transmit, display, etc., a corresponding image portion from the spherical image. Under techniques as described herein, the viewport may be characterized at least in part by a viewer's viewpoint (or view angle) to the spherical image, and the size, shape, geometry, aspect ratio, etc., of a target display device on which an image adapted (e.g., lens corrected, rectilinearly transformed, etc.) from the extracted image portion is to be rendered. In some operational scenarios, a viewer's head position in a VR scene may change from time to time, which then results in different viewports to the VR scene, based on orientation of the viewer's particular head-mounted display (HMD). In some operational scenarios, displays (e.g., semi-panoramic, 130 degree curved, etc.) may support a smaller solid angle images of a scene represent. Different viewports to the scene may be determined based at least in part on geometric/display characteristics of the displays. Additionally, optionally, or alternatively, the different viewports to the scene may be determined based at least in part on one or more of the geometric/display characteristics of the displays, viewer head-tracking information, navigations through mouse, trackball, keyboard, foot tracker, actual body motion, etc.

Display management operations as described herein refer to operations that exploit display capabilities of a target device (e.g., an image rendering device, etc.) for the purpose of rendering (e.g. visual adjustment, tone and gamut mapping, appearance mapping, etc.) viewport images with high details, high dynamic range and accurate. The display management operations may adapt pixel values in viewports of spherical images of a relatively high dynamic range to content-mapped viewport images of a dynamic range supported by the target display device based on a transfer function (e.g., an analytical function, a non-analytical function, a power function, a sigmoid function, polynomials, a lookup table, etc.). In some embodiments, the transfer function can be (e.g., fully, etc.) characterized or specified with a set of one or more transfer function parameters. Some or all of the transfer function parameters such as maximum luminance, mid-tone, and minimum luminance values, etc., may be globally set for a viewport image (or an image of a specific viewport to a specific spherical image).

A spherical map of image metadata may be used to determine a per-viewport value of a globally set transfer function parameter for any viewport of any size, shape, aspect ratio, etc. For example, a spherical map of (locally varying) maximum luminance, mid-tone, and minimum luminance values may be generated from one or more spherical images by convolving a spherical surface filter with pixel values of the spherical images. Based on a view angle, viewport coordinates, an aspect ratio, etc., of a specific viewport, maximum, mid-tone, and minimum luminance values for the specific viewport may be determined or generated by looking up in the spherical map of maximum, mid-tone, and minimum luminance values, by interpolating between adjacent maximum, mid-tone, and minimum luminance values, by comparing multiple maximum, mid-tone, and minimum luminance values within the viewport, etc.

A spherical map of image metadata may be image based (e.g., for a single spherical image, etc.), scene-based (e.g., for a group of spherical images that represent a scene, etc.), program-based (e.g., for multiple groups of spherical images that represent multiple scenes in a media program, etc.), etc. For example, a scene-based spherical map of image metadata may change only at boundaries between adjacent scenes, scene cuts, scene changes, a beginning of a new group of pictures (GOP) representing a scene, etc.

Spherical images in a scene may be recorded based on a content creation coordinate system stationary with a camera system. Rotations and/or translations of the camera system may cause different spherical images in the scene to be spatially shifted among the spherical images. Additionally, optionally, or alternatively, viewpoints and FOVs of a viewer may change in an image rendering environment. Different viewport images of spherical images in a scene may be rendered based on a content rendering coordinate system co-moving with the user's viewpoints and FOVs.

Changes in the viewpoints, FOVs, viewport coordinates, aspect ratios, etc., may cause image portions of the spherical images with different image characteristics to be rendered. Techniques as described herein can be used to handle spatial translations and/or spatial rotations of one or both of the content creation coordinate system and the content rendering coordinate system. Under these techniques, a spherical map of image metadata can be generated (e.g., by using spherical surface filters, etc.) from intermediate spherical images defined in a reference coordinate system as transformed from the spherical images recorded in the content creation coordinate systems. Spatial shifts between two different recorded spherical image of a scene and between a recorded spherical image of the scene and the spherical map of image metadata for the scene can be ascertained by image alignment analyses, sensor data tracking spatial positions and/or locations of the camera system, etc. One or more of these determined spatial shifts (e.g., represented with a vector field, a matrix, etc.) may be used for looking up image metadata parameter values in the spherical map for a specific viewport to a specific recorded spherical image in the scene.

An image metadata parameter (e.g., per-viewport maximum luminance, per-viewport mid-tone luminance, per-viewport minimum luminance, etc.) may have different values, as determined by a spherical map of image metadata, in consecutive viewport images (e.g., images consecutive in time as in a movie, images consecutive in spatial position such as due to a rotated viewpoint, etc.). In response to determining that these consecutive values of the image metadata parameter change significantly (e.g., exceeding a configurable value change threshold, etc.), temporal dampening can be used to dampen or smoothen out any abrupt changes in the values of the image metadata parameter. More specifically, under temporal dampening, the image metadata parameter can transition relatively smoothly and gradually from an initial value to a largely changed value in a dampening time interval, rather than immediately and abruptly transition from the initial value to the largely changed value, for example, when viewports to consecutive spherical images change. The dampening time interval may monotonically increase with the difference in values as determined from the spherical map of image metadata. For example, when average luminance levels in consecutive viewport images as determined from a spherical map of average luminance value, etc., is detected to be significantly changing, a dampening time interval may be set to smoothly transition actual average luminance levels of the viewport images from a first determined value to a second determined value in order to allow the human visual system (HVS) to adapt (e.g., adaptation of the HVS) between the significantly different average luminance levels in the consecutive viewport images.

In some example embodiments, mechanisms as described herein form a part of a media processing system, including but not limited to any of: mobile device, virtual reality system, augmented reality system, head up display device, helmet mounted display device, CAVE-type system or wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Image Content Creation

FIG. 1A illustrates an example image content creation system 100. In some embodiments, image content as described herein comprises spherical images created from image data such as raw high dynamic range images, scene-referred images, etc., as captured by a camera system deployed in a spatial environment. Additionally, optionally, or alternatively, image content as described herein comprises computer-generated imagery information for a (real or artificial) spatial environment. A spatial environment as described herein may be, without limitation, any of: physical spatial environment, simulated spatial environment, movie studios, outdoor scenes, indoor scenes, tunnels, streets, vehicles, ships, aircrafts, outer space, etc.

In some embodiments, the image content creation system (100) comprises a camera system 102 deployed in a spatial environment. In some embodiments, the camera system (102) may comprise, but is not necessarily limited to only, six cameras (respectively denoted as CAM 1 through CAM 6). Some or all of the six cameras may, but are not limited to only, be high dynamic range cameras, directional cameras aiming at specific spatial directions, etc. The six cameras may be configured with overlapping fields of view. As shown in FIG. 1A, CAM 1 through CAM 4 in the camera system (102) are configured to form overlapping fields of view across all angles (360 degrees) of the plane of FIG. 1A. Additionally, optionally, or alternatively, CAM 5 and CAM 6 (not shown) in the camera system (102) may be configured to face up (toward a viewer of FIG. 1A) and down (away from a viewer of FIG. 1A), respectively, relative to the plane represented by FIG. 1A.

In some embodiments, the overlapping fields of views of the six cameras (CAM 1 through CAM 6) cover all solid angles (e.g., a Cartesian coordinate system of 360 degrees times 180 degrees, 4π steradians of a whole sphere, etc.) in the spatial environment in which the camera system (102) is physically present.

The six cameras in the camera system (102) can be controlled to generate six individual video streams 104 over time. The six individual video streams (104) may represent one or more video streams that are simultaneous, contemporaneous, synchronized, near synchronized, asynchronous, time-stamped, time-correlated, etc. In some embodiments, the image content creation system (100) comprises software, hardware, a combination of software and hardware, etc., configured to receive the individual video streams (104) generated by the camera system (102); apply video stitching operations 106 to the individual video streams (104) to generate a panorama video stream 108 that comprises a sequence of (e.g., stitched) panorama images (e.g., 110, 112, etc.); etc. In some embodiments, the video stitching operations (106) (additionally, optionally, or alternatively) comprises depth map generation operations (120) that generate depth maps based on (e.g., diversity information of, etc.) the individual video streams (104) and include the depth maps as a part of, or in conjunction with, the panorama video stream (108) that comprises a sequence of (e.g., stitched) three-dimensional (3D) panorama images (e.g., 110, 112, etc.); etc. In some embodiments, the depth maps may be calculated/generated for most optically captured VR imagery and are used to generate VR imagery that is tuned for a given HMD of a user.

In some embodiments, the panorama images in the panorama video stream (108), whether generated by stitching or another method, are spherical images.

Figure 1B:
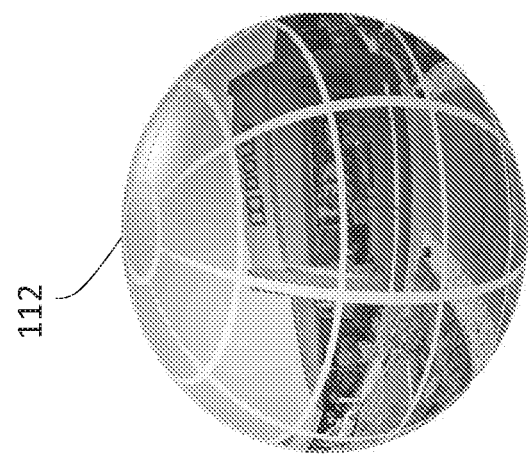
FIG. 1B illustrates an example spherical image in two different representations.
Figure 1B:
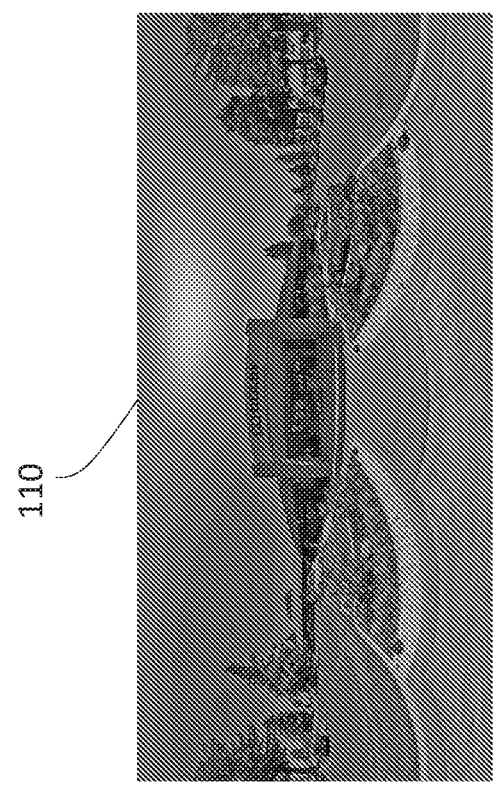

FIG. 1B illustrates an example spherical image in two different representations. In some embodiments, the spherical image may be a spherical image in a (e.g., time) sequence of spherical images in a video stream. Different spherical images in the sequence of spherical images may be indexed by different time values. The spherical image of FIG. 1B may be indexed by a specific time value, and formed by (or generated/stitched from) one or more (e.g., simultaneous, contemporaneous, synchronized, near synchronized, asynchronous, time-stamped, time-correlated, etc.) individual images from individual video stream (e.g., 104 of FIG. 1A, etc.) that are indexed by the same time value.

In a first representation, a spherical image is represented as a 3D surface such as a sphere 112 (e.g., a sphere with a fixed radius, a unit sphere with a radius of one (1), etc.). The sphere (112) comprises spherically arranged pixels with their respective values describing light coming from all spatial directions around a camera system (e.g., 102 of FIG. 1A, etc.). A spherically arranged pixel refers to a pixel that resides, or is arranged, on a spherical surface such as the sphere (112), etc. The spherically arranged pixel values may, but are not limited to only, be densely populated on the sphere (112) to form a high-spatial-resolution high-dynamic-range image. Each of the spherically arranged pixel values may comprise a set of component pixel values of component channels (e.g., Y, Cb, Cr, R, G, B, Dz, Dx, etc.) of a color space (e.g., YCbCr, RGB, YDzDx, etc.). Each of the spherically arranged pixels may correspond to a spatial location (e.g., a point location, etc.) in a plurality of spatial locations on the sphere (112), and may be indexed by such a corresponding spatial location on the sphere (112).

In a second representation, the same spherical image is represented as a projection 110 (of the 3D surface such as the sphere (112) in the 3D space) in a 2D space. The projection (110) can be, but is not necessarily limited to only, any of equirectangular, Mercator, Mollweide, Hammer, Sinusoidal, etc. For the purpose of illustration, the projection (110) represents an equirectangular projection. More specifically, the second representation of the spherical image is related to the first representation of the spherical image by a mapping operation that projects the sphere (112) into the projection (110).

In some embodiments, while the sphere (112) represents a spherical HDR image, the projection (110) represents a 2:1 (360°×180°) equirectangular HDR Image projected from the spherical HDR image. Additionally, optionally, or alternatively, while the spherically arranged pixel values of the spherical image may correspond to pixel values at uniformly distributed spatial locations on the sphere (112), the same spherically arranged pixel values of the spherical image may correspond to pixel values at non-uniformly distributed spatial locations in the projection (110). Techniques as described herein can be used to support spherically arranged pixels that may be of any in a variety of pixel shapes. In some embodiments, spherically arranged pixels as described herein may be of no shape, but rather just represents a position and a value (or series of values) for that position. In some embodiments, spherically arranged pixels as described herein may be of pixel shapes originated from the capture or display aperture of image acquisition devices; these pixel shapes may be, but are not necessarily limited to only, square or rectangular. In some embodiments, a spherically arranged pixel may refer to a subpixel in a complex pixel that comprises a plurality of subpixels. In some embodiments, spherically arranged pixels as described herein need to be of a square shape (or a rectangular shape typical with anamorphic images), but may be of other shapes (e.g. as represented by polygonal pixel descriptors, etc.) other than square and rectangular shapes.

A spherical image as described herein may be recorded as spherically arranged pixel values on a 3D surface such as a sphere (e.g., 112) in the 3D space, and/or recorded as the spherically arranged pixel values projected to an projection (e.g., 110) in the 2D space. The spherically arranged pixel values as projected on the projection (110) represents an equirectangular image in the 2D space (e.g., a 2D Euclidian space as measured by angular degrees, etc.). The equator of the sphere (112) is mapped to the horizontal center line of the projection (110), whereas the poles in the sphere (112) are mapped (stretched substantially) to top and bottom lines of the projection (110).

It should be noted, however, that in various other embodiments, instead of being projected into a 2D plane, a spherical image as described herein such as represented by the sphere (112) can (additionally, optionally, or alternatively) be projected with different map projections, for example, into a cubic map (e.g., a surface in a 3D space), etc.

3. Viewports

In applications involving image rendering (e.g., virtual reality (VR), augmented reality (AR), HMD applications, heads up display (HUD) applications, games, 2-dimensional (2D) display applications, 3-dimensional (3D) display applications, multi-view display applications, etc.), a spherical image as described herein may not be directly rendered to or viewed by a viewer. Instead, a subset of a spherical image (e.g., 110, 112, etc.) can be extracted from the spherical image (e.g., 110, 112, etc.) based on a current view angle of the viewer in a display application (e.g., virtual reality, augmented reality, helmet mounted display application, heads up display applications, etc.). In some embodiments, the subset of the spherical image may correspond to a solid angle (e.g., as measured in steradian, etc.) of a sphere (e.g., 112) representing the spherical image, where the solid angle is originated from the geometric center of the sphere (112). The center of the solid angle may correspond to the current view angle of the viewer.

In a first example, the solid angle corresponds to a circular area on the sphere (112); the diameter of the circular area defines the field of view (e.g. of a virtual camera, etc.) centered about the view angle of the viewer located at the geometric center of the sphere (112). In a second example, the solid angle corresponds an elliptical area on the sphere (112). The elliptical area defines the field of view (e.g. of a virtual camera, HMD, etc.) centered about the view angle of the viewer located at the geometric center of the sphere (112). When circular areas on the sphere (112) are projected into a plane, the projections become more and more elliptical, as they are further away from the Equator. In other examples, solid angles defining fields of view may correspond to areas of different shapes such as angular shapes, polygonal shapes, etc., other than the circular area and the elliptical area.

In some embodiments, solid angles defining fields of view to spherical images may be further adapted into viewports to the spherical images, where the viewports have aspect ratios and/or other geometric properties that match those of image display areas on which pixel values in the viewports of the spherical images are to be rendered.

Figure 2:
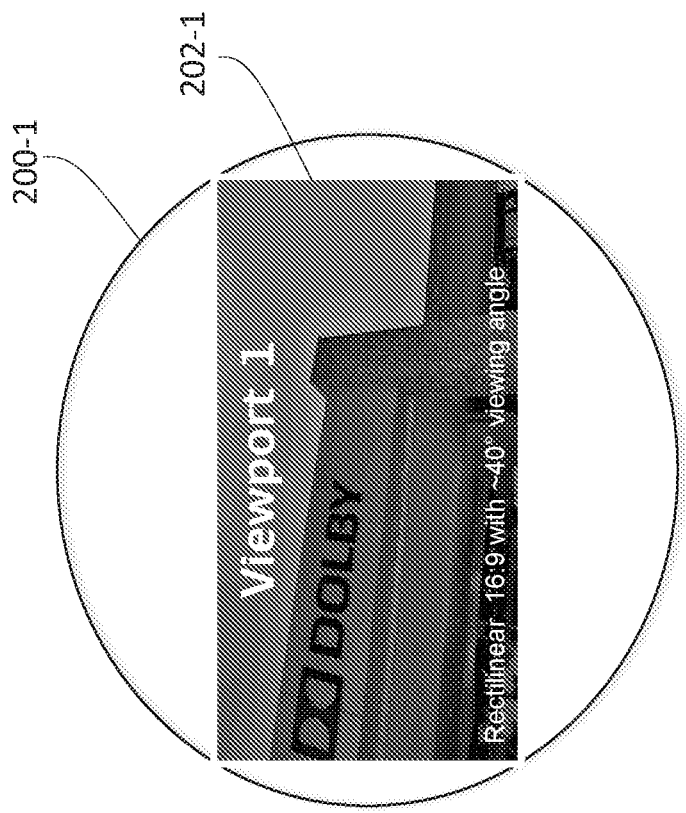
FIG. 2 illustrates example viewports adapted from corresponding solid angles.
Figure 2:
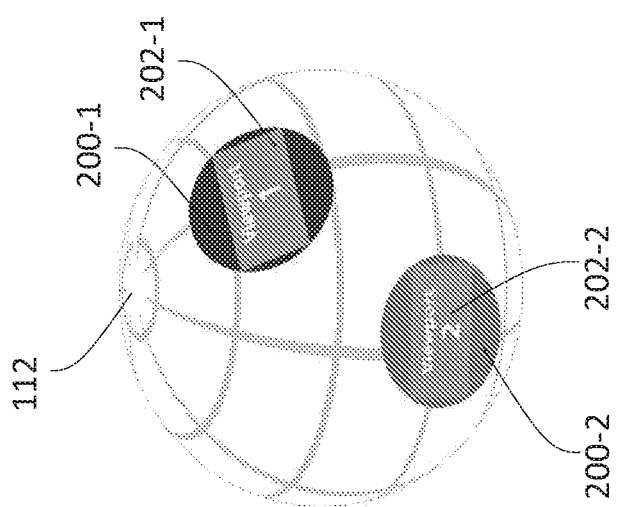

FIG. 2 illustrates example viewports (e.g., 202-1, 202-2, etc.) adapted from corresponding solid angles (e.g., 200-1, 200-2, etc.). In an example, a first subset of a spherical image (or a sphere (112)) in a first solid angle 200-1 is extracted from the spherical image based on a first view angle of a viewer and display size parameters. In another example, a second subset of the spherical image in a second solid angle 200-2 is extracted from the spherical image based on a second view angle of a (e.g., second) viewer.

Each of the subsets of the spherical image may be adapted into a viewport (e.g., 202-1 or 202-2, etc.) for rendering on an image display area. An image with an aspect ratio that corresponds to the geometry of the viewport (or the image display area) can be cropped out of the subset of the spherical image in a solid angle (e.g., 200-1 or 200-2, etc.), and may be called a viewport image. The viewport image may represent a normal view, a telescopic view (e.g., a relatively tiny solid angle of a sphere, etc.), a wide angle view (e.g., a fisheye view, a relatively large solid angle of a sphere, etc.), etc., of a portion of the spherical image. Under other approaches that do not implement techniques as described herein, visual artifacts such as black bars, etc., may be generated when image aspect ratios, view angles, etc., change. In contrast, based on an approach of rendering viewports, which "cuts" viewports out of a (e.g., full) spherical image that covers a wide variety of (e.g., all) view angles and FOVs, the visual artifacts that may be generated under the other approaches can be eliminated under techniques as described herein.

In imaging or display applications in which pixel values in viewports to spherical images are to be rendered in a rectangular image display area of a certain display size, a corresponding rectangular aspect ratio (e.g., in dependence on the display size, etc.) may be applied to a subset of the spherical image in a solid angle (e.g., 200-1 or 200-2, etc.) to generate a rectangular image (e.g., 202-1 or 202-2, etc.) for rendering on the rectangular image display area.

Similarly, in vision applications in which pixel values in viewports to spherical images are to be rendered in a non-rectangular image display area (e.g., wall display, all around display in a CAVE setting, a dome display, a hemispheric display, heart-shape display, triangular display, hexagonal display, circular display, etc.) of a certain spatial dimension, a corresponding non-rectangular aspect ratio may be applied to a subset of the spherical image in a solid angle (e.g., 200-1 or 200-2, etc.) to generate a non-rectangular image (not shown) for rendering on the non-rectangular image display area.

For the purpose of illustration only, a circular area and an elliptical area on a sphere have been illustrated as solid angles. It should be noted that in various other embodiments, other areas that are different from the circular area and the elliptical area—for example, polygonal areas, areas of regular shapes, areas of irregular shapes, or any other shapes—may be used under techniques as described herein for defining fields of view to a spherical image.

4. Spherical Maps of Image Metadata

In some embodiments, spherical images whose pixel values in viewports are to be rendered on target display devices (e.g., a wall display, a television, a cinema display, an HMD display, a mobile display, etc.) may be of relatively high dynamic ranges (e.g., no less than 4,000 nits, an extended dynamic range, represented in a 12-bit video signal, etc.). Image processing systems that implement display management may apply content mapping (e.g., color mapping, tone mapping, a mapping from extended dynamic range to standard dynamic range, etc.) to the pixel values in the viewports to generate content-mapped viewport images that are of relatively narrow dynamic ranges (e.g., less than 4,000 nits, a standard dynamic range, etc.). An image processing system under techniques as described herein may be collocated with a target display device, cloud-based, etc.

In some embodiments, pixel values of a relatively high dynamic range can be tone-mapped or content-mapped based on a transfer function to pixel values of a lower dynamic range supported by a target display device. Some examples of transfer functions, tone mapping, content mapping, etc., are described in SMPTE ST 2084:2014 "High Dynamic Range EOTF of Mastering Reference Displays," which is incorporated herein by reference in its entirety. An image processing system under techniques as described herein may adapt pixel values in viewports of spherical images of a relatively high dynamic range to content-mapped viewport images of a lower dynamic range supported by the target display device based on a transfer function. The transfer function maps pre-display-management pixel values (e.g., reference codewords, perceptual quantized codewords in a codeword space of a high bit depth, extended dynamic range codewords, etc.) such as the pixel values in the viewports of the spherical images of the relatively high dynamic range to content-mapped pixel values (e.g., standard dynamic range codewords, device-specific codewords, perceptual quantized codewords in a codeword space of a relatively small bit depth, etc.) defined in the dynamic range supported by the target display device. The transfer function may be represented and/or approximated by any of: analytical functions, non-analytical functions, piece-wise line segments, piece-wise curve segments, lookup tables, etc.

In some embodiments, the transfer function is (e.g., fully, etc.) characterized or specified with a set of one or more transfer function parameters. The transfer function parameters may include, but are not limited to only, any of: anchor points of the transfer function, free parameters in the transfer function, etc. In some embodiment, some or all of the transfer function parameters are adaptively set or determined based on image content such as pre-display-management pixel values in the viewports of the spherical images, etc. The transfer function parameters can be provided as image metadata with the pixel values of the viewports of the spherical images to the target display device.

In some embodiments, some or all spherically arranged pixel values of the spherical images—including but not necessarily limited to only, the pixel values within the viewports of the spherical images—may be carried/transmitted in a first layer of a multi-layer video signal, whereas the image metadata including the transfer function parameters set or determined based on the pixel values of the viewports of the spherical images may be carried/transmitted in a second different layer of the multi-layer video signal.

A recipient device (e.g., the target display device, a set-top box or a computing device operating in conjunction with the target display device, etc.) that receives the multi-layer video signal may decode the pixel values of the viewports of the spherical images and the image metadata from the video signal and apply display management operations to the pixel values of the viewports of the spherical images based on the transfer function specified by the transfer function parameters in the image metadata.

In some embodiments, image metadata parameters including but not limited to some or all of the transfer function parameters may be globally set for a viewport image (as represented by pixel values in a viewport) of a spherical image to be rendered by the target display device. A globally set transfer function parameter may mean that the transfer function parameter is set to the same value in the entire viewport image.

For the purpose of illustration only, the transfer function parameters as described herein may comprise a minimum luminance value (denoted as $S_{min}$), a maximum luminance value (denoted as $S_{max}$), a mid-tone luminance value (denoted as $S_{mid}$), etc. A single value may be determined based on (e.g., all, all but excluding those in a letterbox, all but excluding those in a blackbar, etc.) codewords of a viewport image of a spherical image for each of the luminance values $S_{min}$, $S_{max}$, and $S_{mid}$.

Under techniques as described herein, a spherical distribution of a locally varying image metadata parameter (or simply a spherical map of image metadata) that corresponds to a globally set image metadata parameter may be determined for a spherical image independent of any viewport image of the spherical image. For example, a spherical distribution of a local transfer function parameter that corresponds to a globally set transfer function parameter may be determined for the spherical image independent of any viewport image of the spherical image. As used herein, a spherical distribution or a spherical map may refer to a spatial distribution on a 3D surface such as a sphere in a 3D space, or a spatial distribution on a projection (of a sphere) in a 2D space.

Examples of image metadata (or image metadata parameters) whose spatial distributions may be captured/represented in spherical maps as described herein may include, but are not limited to only, any of: scalar values, vector values, matrix values, content mapping parameters, color mapping parameters, tone mapping parameters, prediction related parameters, lifts, gains, and gamma values in transfer functions, histograms of image codewords, statistical values of image codewords, luminance values, chroma values, primary color values, white point values, spatial resolutions, light maps, depth maps, saliency maps, regions of interest (ROI), frame rates, movements, motion vectors, mappings between one of a perceptually quantized space and a linearly quantized space and another of one of a perceptually quantized space and a linearly quantized space, etc.

As used herein, whereas a corresponding globally set transfer function may be fixed for a specific viewport image of the spherical image, a locally varying image metadata parameter such as a local transfer function parameter, etc., may vary in values at different spatial locations and thus different corresponding view angles of a spherical image. A spherical distribution of a locally varying image metadata parameter refers to a spherical map or a spherical distribution of these different values at the different view angles of the sphere.

Under techniques as described herein, an image processing system as described herein may use a spherical distribution of the local transfer function parameter to derive a (e.g., single) value for the corresponding globally set transfer function parameter for a viewport of any size or any aspect ratio at any view angle of the spherical image.

For example, a spherical distribution of local minimum luminance values (denoted as $s_{min}$), which correspond to a globally set minimum luminance value (denoted as $S_{min}$), may be generated under techniques as described herein; a spherical distribution of local maximum luminance values (denoted as $s_{max}$), which correspond to a globally set maximum luminance value (denoted as $S_{max}$), may be generated under techniques as described herein; a spherical distribution of local mid-tone luminance values (denoted as $s_{mid}$), which correspond to a globally set mid-tone luminance value (denoted as $S_{mid}$), may be generated under techniques as described herein.

Figure 3:
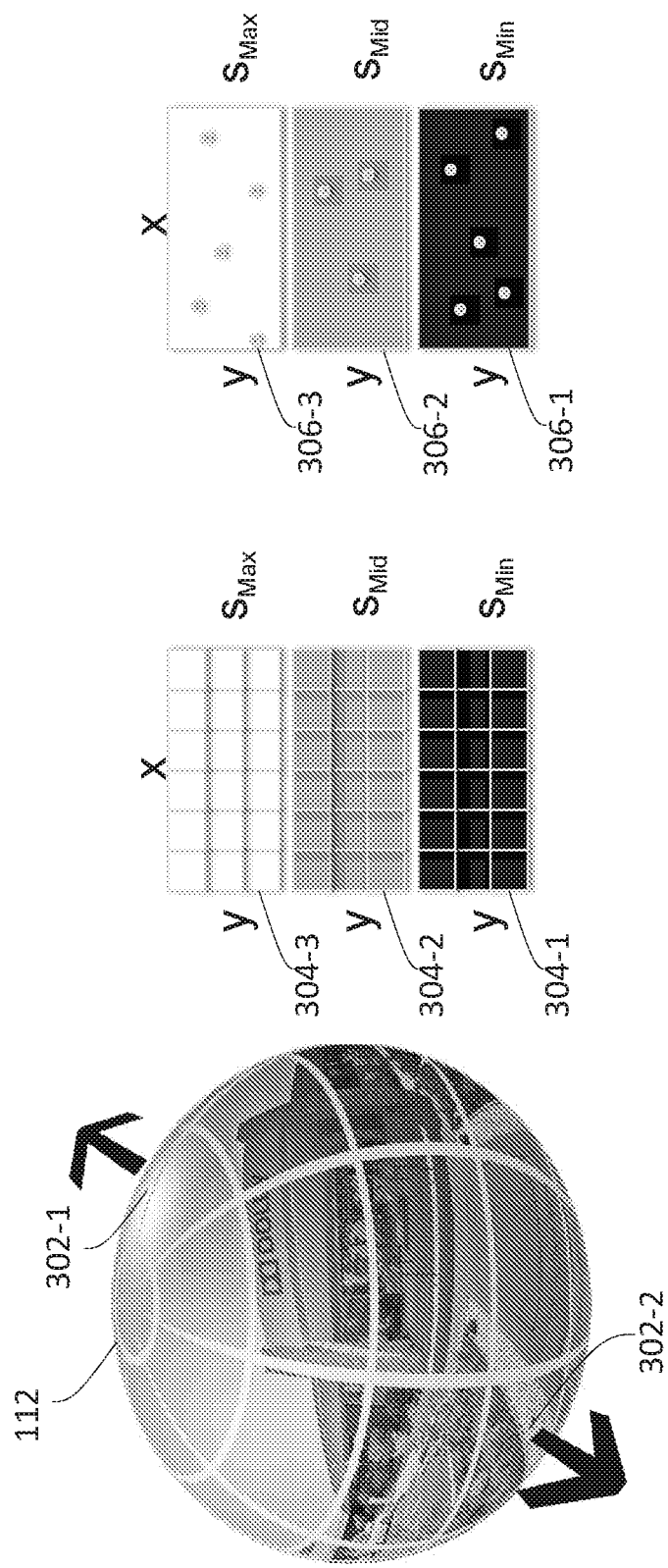
FIG. 3 illustrates example spherical distributions of locally varying image metadata parameters for a spherical image.

FIG. 3 illustrates example spherical distributions of locally varying image metadata parameters for a spherical image (e.g., represented by a sphere 112, etc.). The locally varying image metadata parameters are (e.g., a portion of, etc.) image metadata separate from image data such as spherically arranged pixel values of a spherical image or pixel values of viewport images of the spherical image. The image metadata parameters comprise operational parameters some or all of which may be used in image processing operations performed on image content (e.g., spherically arranged pixel values, etc.) of spherical images as described herein. Examples of locally varying image metadata parameters as described herein may include, but are not necessarily limited to only, any of: local transfer function parameters that correspond to globally set transfer function parameters, perceptual quantization parameters, etc.

As illustrated in FIG. 3, the spherical distributions of the locally varying image metadata parameters are spherical distributions of local luminance values $s_{min}$, $s_{max}$, and $s_{mid}$. Spherical distributions of locally varying image metadata parameters, such as the spherical distributions of local luminance values $s_{min}$, $s_{max}$, and $s_{mid}$, etc., may be represented in any of a variety of representations. The spherical distributions of local luminance values $s_{min}$, $s_{max}$, and $s_{mid}$ may be represented in a Cartesian representation with matrix elements indexed by x and y coordinates (e.g., representing latitudes and longitudes, etc.). For example, a first set of matrix elements 304-1 may represent a spherical distribution of local minimum luminance values $s_{min}$. A second set of matrix elements 304-2 may represent a spherical distribution of local mid-tone luminance values $s_{mid}$. A third set of matrix elements 304-3 may represent a spherical distribution of local maximum luminance values $s_{max}$. Metadata can also stay in the spherical domain.

Additionally, optionally, or alternatively, the spherical distributions of local luminance values $s_{min}$, $s_{max}$, and $s_{mid}$ may be represented in a vector representation with vector elements indexed by x (longitude) and y (latitude) coordinates. The vector may be defined as one from the center of the spherical image to the x (longitude) and y (latitude) coordinates on the spherical image, or alternatively one from the center of a projection of the spherical image to the x (longitude) and y (latitude) coordinates on the projection of the spherical image. For example, a first set of vector elements 306-1 may represent a spherical distribution of local minimum luminance values $s_{min}$. A second set of vector elements 306-2 may represent a spherical distribution of local mid-tone luminance values $s_{mid}$. A third set of vector elements 306-3 may represent a spherical distribution of local maximum luminance values $s_{max}$. In some embodiments, techniques such as those related to median cut algorithm may be used to convert a spherical distribution of image metadata in a matrix representation to a spherical distribution of the same image metadata in a non-matrix representation. These techniques may be used to identify darks, mid-tones, highlights and/or bright parts of a spherical image and generate a vector representation comprising a set of vector coordinates identifying positions of the darks, mid-tones, highlights and/or bright parts. The set of vector coordinates may comprise combinations/coordinates of longitude and latitude. Some discussion of median cut algorithms can be found in P. Debevec, "A Median Cut Algorithm for Light Probe Sampling," Technical Report 67, USC Institute for Creative Technologies (2005), the content of which is incorporated by reference herein.

Local luminance values in spherical distributions such as illustrated in FIG. 3 may vary spatially from one sphere portion to another sphere portion. By way of example, a first sphere portion near or at a first spatial location 302-1 of the spherical image (e.g., represented by the sphere 112, etc.) may depict the Sun; thus the local minimum luminance value, the local mid-tone luminance value, the local maximum luminance value in the spherical distributions of local luminance values as computed from the first sphere portion of the spherical image may be of very high values. On the other hand, a second sphere portion near or at a second spatial location 302-2 of the spherical image (e.g., represented by the sphere 112, etc.) may depict an image portion away from the Sun; thus the local minimum luminance value; the local mid-tone luminance value, the local maximum luminance value in the spherical distributions of local luminance values as computed from the second sphere portion of the spherical image may be of values much lower than those in the first sphere portion. Furthermore, the local minimum luminance value; the local mid-tone luminance value, the local maximum luminance value in the spherical distributions of local luminance values as computed from the second sphere portion of the spherical image may have relatively large deviations among these local luminance values in the second sphere portion.

5. Spherical Surface Filters and Filter Kernels

In some embodiments, spherical distributions of locally varying image metadata parameters as described herein may be generated by applying spherical surface filters to a spherical image (e.g., by convolution, etc.). In some embodiments, spherical surface filters are surface operators rather than volume operators. The spherical surface filters may, but are not necessarily limited to only, operate with a surface that may be curved. From the point of view of the filter operation, a spherical surface filter may convolve over a 2D array of pixels from images such as spherical images. However, the 2D array of pixels may come from, or be curvilinear with (e.g., follow the curvature of, etc.), a curved surface due to a curve surface representation such as a spherical representation. The spherical surface filters may be convolved with pixel values of the spherical image by moving filter kernels centers of the spherical surface filters over latitudes and longitudes represented in the spherical image to derive the spherical distributions of the locally varying image metadata parameters as filtered values of the spherical image. In some embodiments, spherical surface filters as described herein are nonlinear filters such as luminance filters that will be discussed in detail later. In some embodiments, spherical surface filters as described herein are linear filters, etc. These linear filters may, but are not necessarily limited to only, comprise kernels representing weights to an overall sum.

Figure 4A:
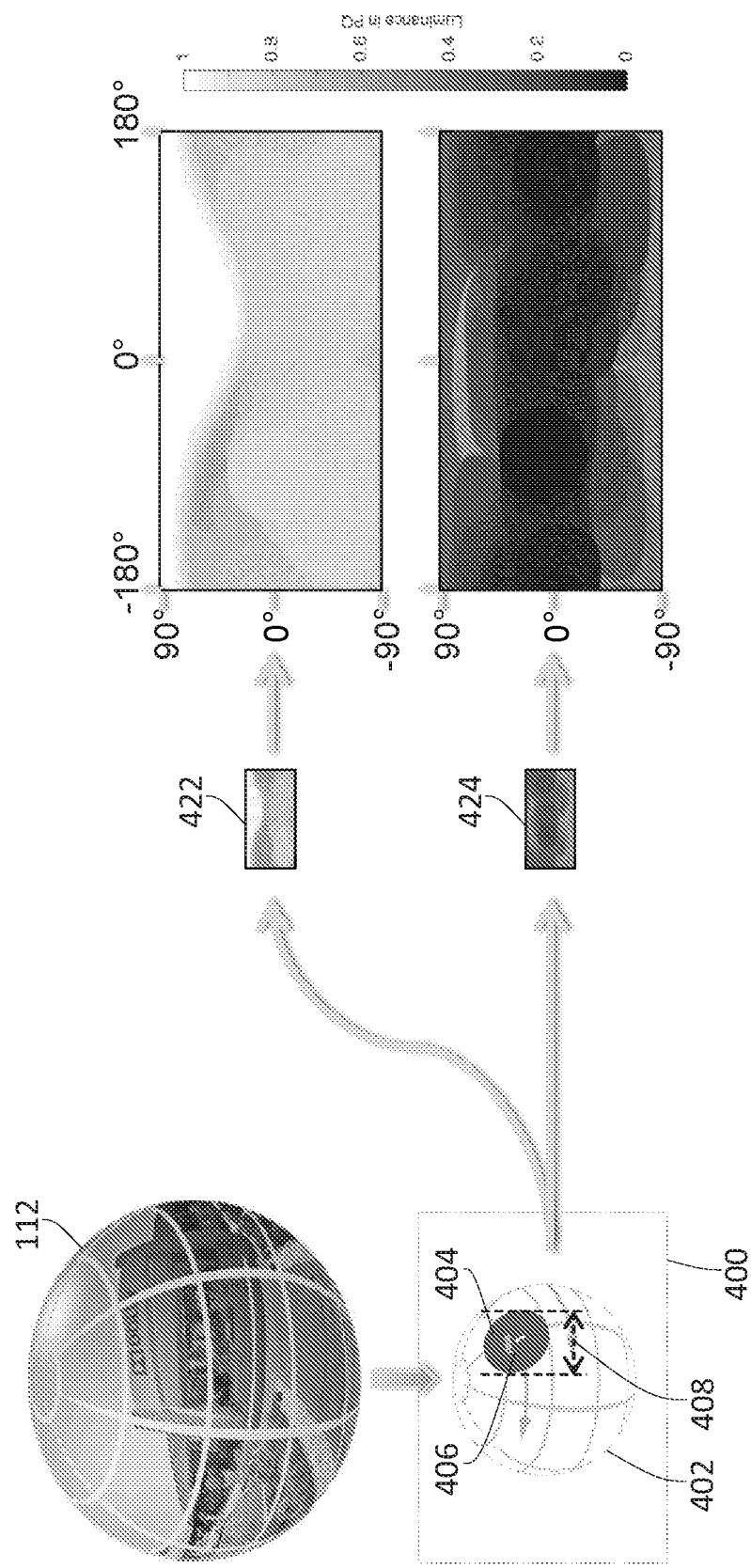
FIG. 4A and FIG. 4B illustrate example representations of a maximum and minimum luminance value spherical surface filter.
Figure 4B:
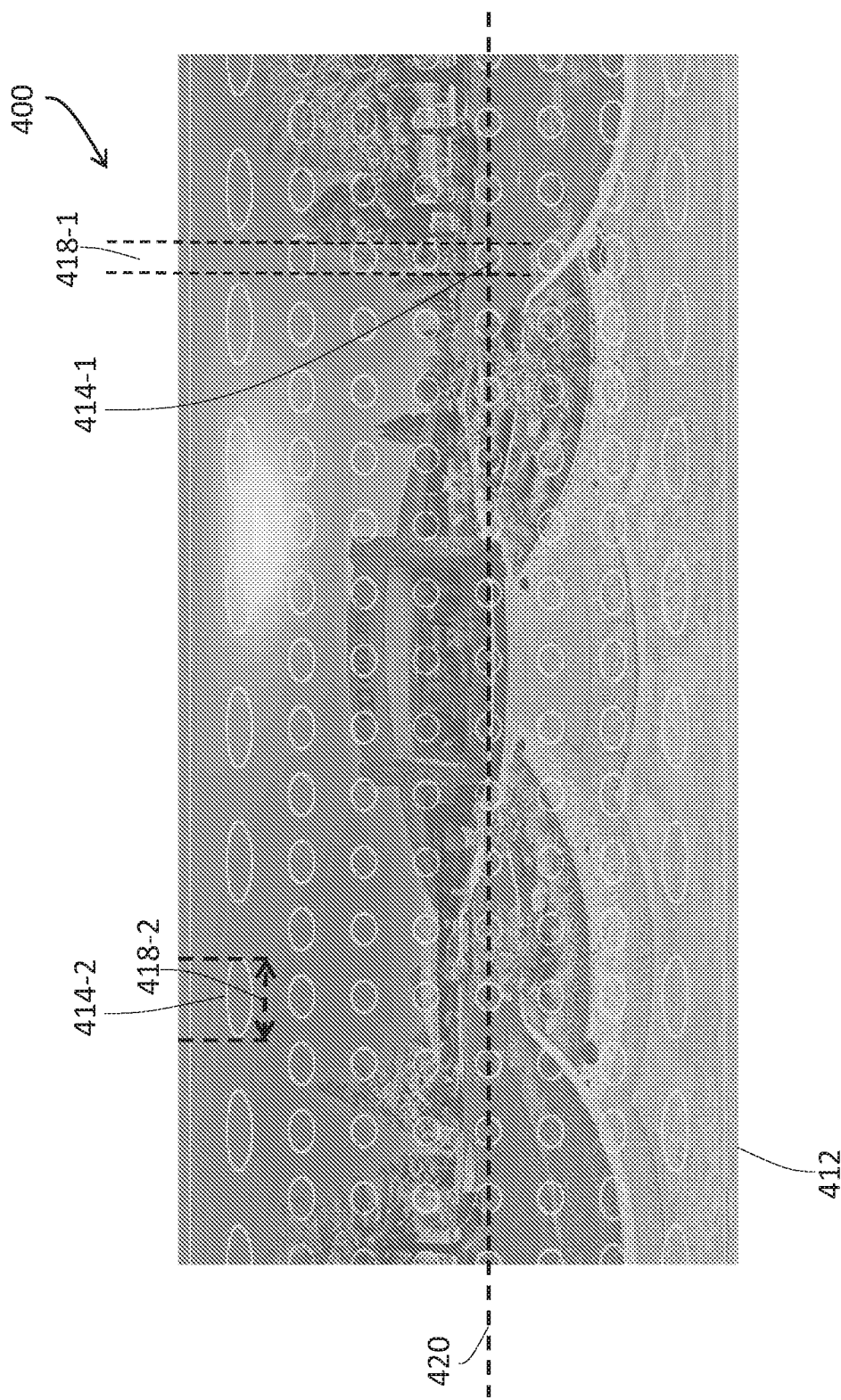

FIG. 4A illustrates an example representation of a maximum and minimum luminance value spherical surface filter 400 represented as a 3D surface. FIG. 4B illustrates an example representation of the same maximum and minimum luminance value spherical surface filter (400) represented in a 2D space. In either representation, the same maximum and minimum luminance value spherical surface filter (400) can be used to generate spherical distributions (e.g., 422 of FIG. 4A, 424 of FIG. 4A, etc.) of local luminance values $s_{min}$ and $s_{max}$ for one or more spherical images (e.g., 110, 112, etc.).

In some embodiments, a spherical surface filter such as the maximum and minimum luminance value spherical surface filter (400), etc., as represented in a 3D space as a 3D surface, may be of a filter kernel (e.g., 404 of FIG. 4A, etc.) that is a constant-size constant-shaped spherical area in a unit sphere (e.g., 402 of FIG. 4A, etc.) in the 3D surface. The maximum and minimum luminance value spherical surface filter (400) as represented as the 3D surface may be used to filter spherically arranged pixel values of spherical images represented as spheres (e.g., 112, unit spheres, spheres with fixed radii, etc.) in the same 3D surface.

In some embodiments, the spherical circular area representing the filter kernel of the maximum and minimum luminance value spherical surface filter (400) is of a constant diameter V (=2r) (408 of FIG. 4A) and has a (e.g., moving) center point P (e.g., 406 of FIG. 4A, the geometric center of the spherical circular area, etc.) on the unit sphere (402). The diameter V (408) corresponds to a constant-sized solid angle of the unit sphere (402) as covered by the spherical circular area; for example, the constant-sized solid angle is proportional to the diameter V squared.

In some embodiments, by moving the filter kernel of the maximum and minimum luminance value spherical surface filter (400) over all (e.g., quantized, discrete, etc.) latitudes and longitude as represented in the spherical images and filtering over spherically arranged pixel values of the spherical images, the spherical distributions (e.g., 422 of FIG. 4A, 424 of FIG. 4A, etc.) of local luminance values $s_{min}$ and $s_{max}$ for the spherical images (e.g., 110, 112, etc.) can be obtained as spatially distributed filtered values generated by the maximum and minimum luminance value spherical surface filter (400).

In some embodiments, a spherical surface filter such as the maximum and minimum luminance value spherical surface filter (400), etc., as represented in the 2D space, may use a variable filter kernel to filter over a spherical image represented as a projection in the same 2D space, instead of using fixed filter kernels for filtering a rectilinear image as in other approaches.

As illustrated in FIG. 4B, the variable filter kernel represents variable-sized areas (e.g., 414-1 of FIG. 4B, 414-2 of FIG. 4B, etc.) at different spatial locations of a projection (412) in the 2D space. More specifically, sizes of the variable-sized areas (e.g., 414-1 of FIG. 4B, 414-2 of FIG. 4B, etc.) representing the filter kernel of the filter at different spatial location in the 2D projected coordinate system (412) vary with latitude. Each of the variable-sized areas (e.g., 414-1, 414-2, etc.) representing the variable filter kernel may, but is not limited to only, be an approximate ellipse. The approximate ellipse has a major axis (e.g., the longest line that can be made within the approximate ellipse) denoted as I (e.g., 418-1, 418-2, etc.) and a center point P (or the geometric center of the approximate ellipse). Besides filter kernels of circular shapes, elliptical shapes, filter kernels of other shapes may also be used in various embodiments. For example, in some embodiments, rectangular filters with varying point-spread-function shapes over a constant kernel size may be used. This may be used to reduce programming complexity in some applications.

At the central line 420 (or zero latitude) of the projection, the indicatrix of the approximate ellipse (e.g., the variable-sized area 414-1, etc.) representing the filter kernel of the filter reaches a minimum length; the approximate ellipse (414-1) thus becomes an approximate circular area. However, further and further off from the central line (420) (e.g., or closer and closer to the top and bottom lines representing +/−90 degrees in latitude), major axes (e.g., 418-2, etc.) of approximate ellipses (e.g., the variable-sized area 414-2, etc.) representing the filter kernel of the filter increase in length.

In some embodiments, the approximate ellipses (e.g., the variable-sized area 414-1 of FIG. 4B, the variable-sized area 414-2 of FIG. 4B, etc.), which represent the filter kernel at different latitudes/longitudes on the planar surface as illustrated in FIG. 4B, is projected (e.g., by the same map projection that projects a spherical image as a surface in the 3D space to a projection in the 2D space) from corresponding constant-size spherical circular areas (e.g., 404 of FIG. 4A, etc.) representing the filter kernel over a 3D surface (or a surface in the 3D space) as illustrated in FIG. 4A.

In some embodiments, the maximum and minimum luminance value spherical surface filter (400) as represented in the 2D space in FIG. 4B may be used to filter spherically arranged pixel values of spherical images (e.g., 110, etc.) represented in the same 2D space to obtain the spherical distributions (e.g., 422 of FIG. 4A, 424 of FIG. 4A, etc.) of local luminance values $s_{min}$ and $s_{max}$ for spherical images (e.g., 110, 112, etc.).

In some embodiments, a (circular) filter kernel, whether represented by a (e.g., moving) spherical circular area on a sphere, or a (e.g., moving) approximate ellipse in a 2D projected coordinate system, can be computed as follows.

Let $P_{Lat}$ and $P_{Lon}$ denote the latitude and longitude of a current center P of the filter kernel, respectively. Let $C_{Lat}$ and $C_{Lon}$ denote the latitude and longitude of a spatial location C of a spherically arranged pixel in a spherical image P, respectively. In some embodiments, a latitude quantity such as $P_{Lat}$, $C_{Lat}$, etc., may initially be expressed as angular degrees from −90 degrees to 90 degrees. A longitude quantity such as $P_{Lon}$, $C_{Lon}$, etc., may initially be expressed as angular degrees from 0 degrees to 360 degrees.

The latitudes and longitudes may be converted from degrees to radians, as follows:

$$P_{Lat,R} = P_{Lat} \pi / 180 \quad (1\text{-}1)$$

$$C_{Lat,R} = C_{Lat} \pi / 180 \quad (1\text{-}2)$$

$$P_{Lon,R} = P_{Lon} \pi / 180 \quad (2\text{-}1)$$

$$C_{Lon,R} = C_{Lon} \pi / 180 \quad (2\text{-}2)$$

The distance D between the spatial location C of the spherically arranged pixel and the current center P of the filter kernel may be computed as the length of a curve section (corresponding to a geodesic or a part of a great circle on the unit sphere) passing through C and P, as follows:

$$D = \cos^{-1}(\sin C_{Lat,R} \cdot \sin P_{Lat,R} + \cos C_{Lat,R} \cdot \cos P_{Lat,R} \cdot \cos(P_{Lon,R} - C_{Lon,R})) \quad (3)$$

A set (denoted as F) of spherically arranged pixels in the spherical image within the circular filter kernel may be identified as all spherically arranged pixels with spatial locations (e.g., quantized latitudes, quantized longitudes, etc.) each of which is of a distances D to the current center P of the filter kernel less than the diameter V of the circular filter kernel, as follows:

$$F = C | (D < V) \quad (4)$$

where F is C such that D is less than V.

At the current center P of the filter kernel, the maximum and minimum luminance spherical surface filter may generate or determine local luminance values $s_{min}$ and $s_{max}$ using maximum and minimum luminance values in the set F of all spherically arranged pixels in the filter kernel. As the filter kernel filters over (or moves the current center P across) all portions of a spherical image (e.g., 110 of FIG. 1B, 112 of FIG. 1B, etc.), the spherical distributions of the local luminance values $s_{min}$ and $s_{max}$ can be obtained for the spherical image.

For the purpose of illustration only, it has been described above that spherical distributions of local maximum and minimum luminance values can be obtained by filtering spherical images with spherical surface filters of circular filter kernels in a 3D surface (or a surface in a 3D space) or filter kernels with variable-sized areas in a 2D space, where the locality is determined by the kernel size. It should be noted that in various embodiments, spherical distributions of locally varying image metadata parameters (or spherical maps of image metadata) such as the local maximum and minimum luminance values (e.g., generated by luminance value spherical surface filters or luminance spherical surface filters, etc.) and others (e.g., generated by chroma value spherical surface filters or chroma spherical surface filters, etc.) may be computed with spherical surface filters of circular filter kernels over a 3D surface (or a surface in a 3D space) or filter kernels with variable-sized areas in a 2D space based on spherically arranged pixel values of one or more spherical images. Additionally, optionally, or alternatively, spherical distributions of locally varying image metadata parameters (or spherical maps of image metadata) may be similarly computed with spherical surface filters of non-circular filter kernels over a 3D surface (or a surface in a 3D space) or filter kernels with variable-sized areas that are not approximate ellipses in a 2D space based on spherically arranged pixel values of one or more spherical images.

Furthermore, for the purpose of illustration only, the spherical distributions (e.g., 422 of FIG. 4A, 424 of FIG. 4A, etc.) of local luminance values $s_{min}$ and $s_{max}$ for spherical images (e.g., 110, 112, etc.) in FIG. 4A are represented as projections in a 2D space. It should be noted, however, that in various embodiments, spherical distributions of locally varying image metadata parameters may be represented as projections in a 2D space, as 3D surfaces such as spheres, as cubic maps, etc.

A spherical distribution of a locally varying image metadata parameter (or a spherical map of image metadata) as described herein may be generated for a single spherical image, a group of spherical images that represent a scene, multiple groups of spherical images that represent multiple scenes, etc. As used herein, the term "scene" for a panorama video sequence (a sequence of spherical images) may relate to a series of consecutive frames (e.g., images taken at different consecutive time points, a sequence of spherical images, a sequence of viewport images, etc.) in the video sequence sharing similar color and dynamic range characteristics. Because of the consecutive nature of video prediction in many video compression formats, some or all spherical maps of image metadata may change only at boundaries (or scene cuts) such as scene changes or a beginning of a new group of pictures (GOP) representing a scene. In some embodiments, a spherical distribution of a locally varying image metadata parameter generated under techniques as described herein remains the same for all the images in a group of spherical images that represents a scene. In some embodiments, some or all parameter values derived from the spherical maps of image metadata as related to video encoding and/or decoding of viewport images may also change only at boundaries (or scene cuts) such as scene changes or a beginning of a new group of pictures (GOP) representing a scene. Additionally, optionally, or alternatively, some or all parameter values derived from the spherical maps of image metadata as related to video encoding and/or decoding of viewport images may change when spatial orientations and/or spatial translations of viewports within a scene change.

6. Spatial Shifts in Spherical Images and Viewports

Figure 5A:
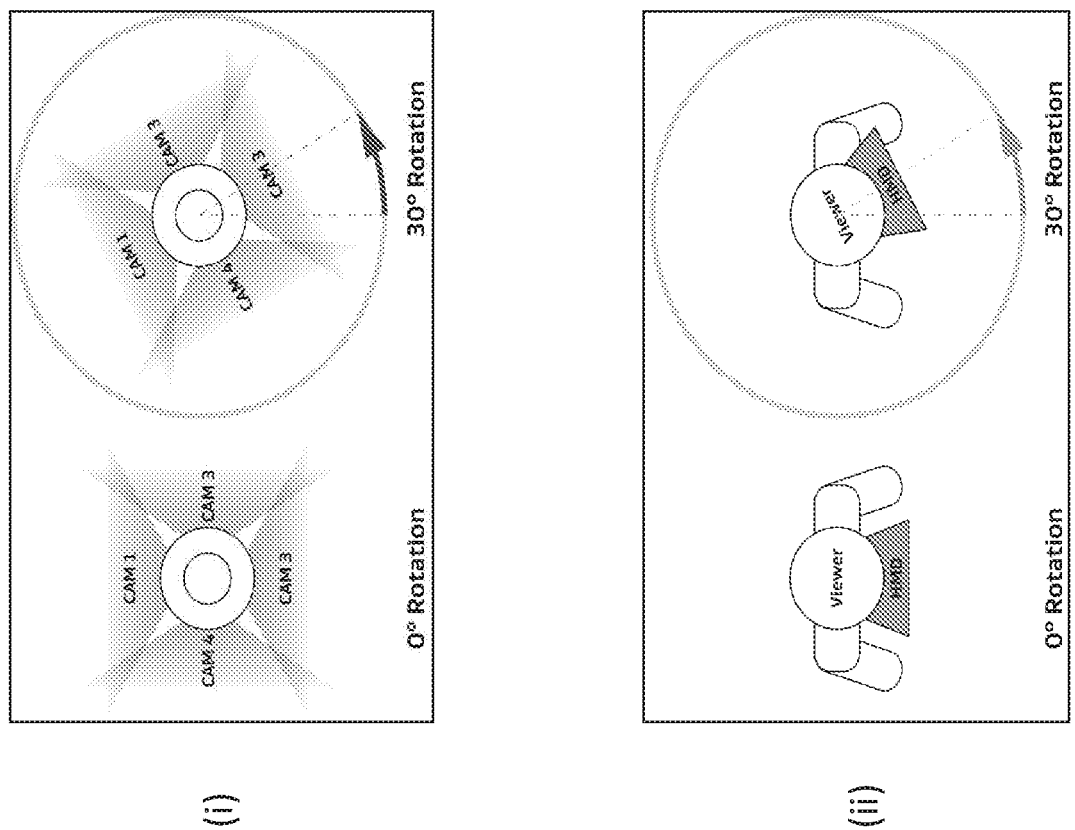
FIG. 5A illustrates an example rotation in a content creation environment.

Spherical images in a group of spherical images in a scene may be recorded based on a content creation coordinate system (e.g., a camera coordinate system, etc.) that is stationary or fixed to a camera system (e.g., 102 of FIG. 1A, worn by a rider or a pedestrian, mounted on a vehicle, etc.). While the camera system (102) is used to generate the group of spherical images in the scene, the camera system (102) may be moved, rotated, panned, tilted, zoomed, etc., from time to time. In some embodiments, the camera system (102)—e.g., a go-pro style head-mounted camera which is worn by a rider who may rotate the camera from time to time, a camera system which supports "motion-on-a-rail," etc.—may be used to provide images for 360-degree VR display applications. In some embodiments, the camera system (102) may be used to provide images for less than 360-degree VR display applications such as 180-degree VR display applications. In some operational scenarios, the camera system (102) may be connected to a biker's helmet and the biker looks left or right from time to time, as illustrated in FIG. 5A(i). This rotates spherical images generated in part by the camera system (102). As a result, spherically arranged pixel values in different spherical images in the scene, which depict same objects, may be translated and/or rotated between or among the different spherical images. When the camera moves, this causes global motion in the spherical image (when a scene or globe reference coordinate system is used).

The content creation coordinate system can be defined/specified relative to spatial positions (e.g., of a fixed point on the camera system (102), etc.) and/or spatial orientations (e.g., of one or more optical axes on the camera system (102), etc.) of the camera system (102). Each spatial position and/or spatial orientation in the spatial positions and/or spatial orientations may be indexed by the same time value that indexes spherical images generated by the camera system (102) located at such spatial position and/or spatial orientation.

Filtering these different spherical images generated based on the content creation coordinate system in reference to different spatial positions and/or spatial orientations indexed by different time values may result in different (rotated and/or translated) spherical distributions of the same locally varying image metadata parameter between or among the different spherical images.

Additionally, optionally, or alternatively, viewport images of spherical images in a group of spherical images in a scene may be rendered (or played back) based on a content rendering coordinate system (e.g., an HMD coordinate system, etc.) that is stationary or fixed to an image display device (e.g., worn by a viewer, etc.). While the image display device is used to render the viewport images of the spherical images in the scene, the image display device may be rotated from time to time, as illustrated in FIG. 5A(ii). For example, a viewer wearing a VR headset looks around in the scene, thereby changing the viewer's viewports in terms of spatial orientations from time to time, even though the camera viewpoint (or view angle) remains constant.

Techniques as described herein can be used to handle spatial translations and/or spatial rotations of one or both of the content creation coordinate system and the content rendering coordinate system. Under these techniques, at the content creation time, different spherical images in the scene may be transformed into a reference coordinate system that is independent of the translations and/or rotations of the camera system (102). In some embodiments, the reference coordinate system may be directly or indirectly defined in relation to a universal reference coordinate system such as a world coordinate defined in relation to the Earth's position and orientation, the solar system's spatial location, spatial orientation, etc. In these embodiments, the reference coordinate system may be called as an absolute reference coordinate system. In some embodiments, the reference coordinate system may be of spatial orientations (e.g., the North, etc.) directly or indirectly defined in relation to a universal reference coordinate system but may be of spatial positions that are co-moving (in spatial translations) with the camera system (102). In these embodiments, the reference coordinate system may be called as a relative reference coordinate system. The relative reference coordinate system may be used, for example, where translational movements (e.g., bicycle movements, pedestrian movements, etc.) of the camera system (102) in the scene is relatively slow to cause insignificant image content changes for the spherical images in the scene but rotational movements of the camera system (102) (e.g., where the camera system (102) is mounted on a moving helmet, etc.) in the scene generates relatively significant image content changes (e.g., rotated images, etc.) for the spherical images in the scene.

In some embodiments, the reference coordinate system may be directly or indirectly defined in relation to a reference coordinate system used in a vision application such as virtual reality, augmented reality, helmet mounted display applications, heads up display applications, games, 2D display applications, 3D display applications, multi-view display applications, etc. For example, the reference coordinate system as described herein for generating spherical distributions of locally varying image metadata parameters may correspond (or be isometrically mapped) to a reference coordinate system used at image rendering time of the vision application, the latter of which may also be used to track the spatial position and the spatial orientation (e.g., of the eyes, of the head, etc.) of a viewer of the vision application for the purpose of determining what viewports are to be used to render viewport images of the spherical images in the scene.

Figure 5B:
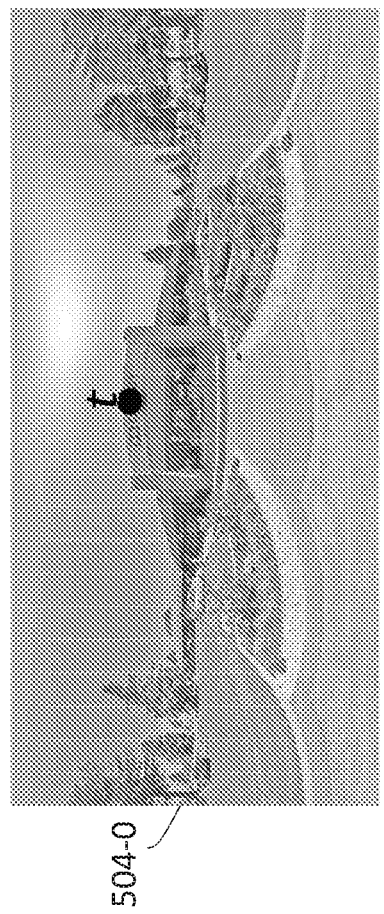
FIG. 5B illustrates example spherical images indexed with rotation vectors.
Figure 5B:
Figure 5B:
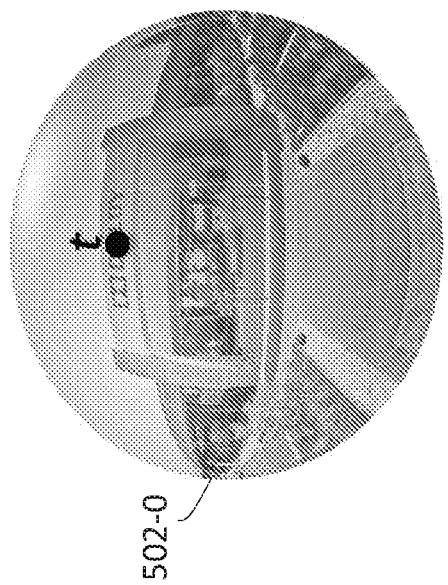
Figure 5B:
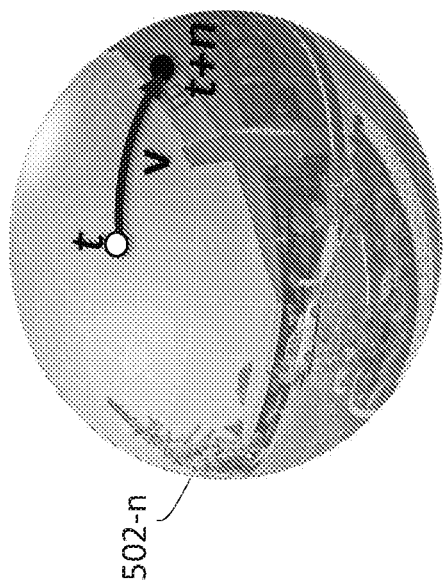

FIG. 5B illustrates two example spherical images indexed by rotation vectors at a 0-th time value t and an n-th time value t+n (where n is a positive integer), respectively. A time value may be an integer (e.g. frame rate), float (e.g., fractional), etc. The two spherical images belong to the same scene. Each spherical image is represented by either a sphere in a 3D space or a projection in a 2D space. For example, a 0th spherical image indexed by the 0-th time value t is represented as a 0-th sphere 502-0 in the 3D space or a 0-th projection 504-0, whereas an n-th spherical image indexed by the n-th time value t+n is represented as an n-th sphere 502-n in the 3D space or an n-th projection 504-n. Under techniques as described herein, the 0-th spherical image (502-0, 504-0) and the n-th spherical image (502-n, 504-n) can be determined as being related by a rotation. Because of the rotation, a point in the 0-th spherical image (502-0, 504-0) at the 0-th time value t is determined as being related by a shift v (e.g., pitch, roll, yaw, etc.) to a corresponding point in the n-th spherical image (502-n, 504-n). This shift v can be represented by either an angular vector (e.g., comprising vector components as angles) in the 3D space or a linear vector (e.g., comprising vector components as linear displacements in a plane) in the 2D space.

This rotation may be determined/identified as a rotation of a content creation coordinate system (in which the first and second spherical images are created) relative to a reference coordinate system. In an example, such a rotation may be determined/identified based on one or more image alignment algorithms such as SIFT (Scale Invariant Features Transform), etc. The image alignment algorithms can be used to identify and analyze invariant features depicted in spherically arranged pixels of the spherical images, determine the shift v (e.g., in terms of latitude and longitude, pitch, roll, yaw, etc.), determine the rotation based on some or all shifts identified for the invariant features, etc.

Additionally, optionally, or alternatively, one or more locational sensors such as one or more of (e.g., internal, etc.) motion sensors, position sensors, orientation sensors, gyroscopes, electronic compasses, accelerometers, global positioning system (GPS) modules, etc. may be deployed/collocated with the camera system (102) and may be used to track spatial positions and/or locations of the camera system (102). Based on tracking data from the locational sensors, the rotation of the content creation coordinate system with respect to the reference coordinate system, or shifts between corresponding spherically arranged pixels of (e.g., successive, indexed by t, t+1, t+2, t+n, etc.) different spherical images in the scene, may be determined.

7. Generating Spherical Maps for Images with Spatial Shifts

Figure 5C:
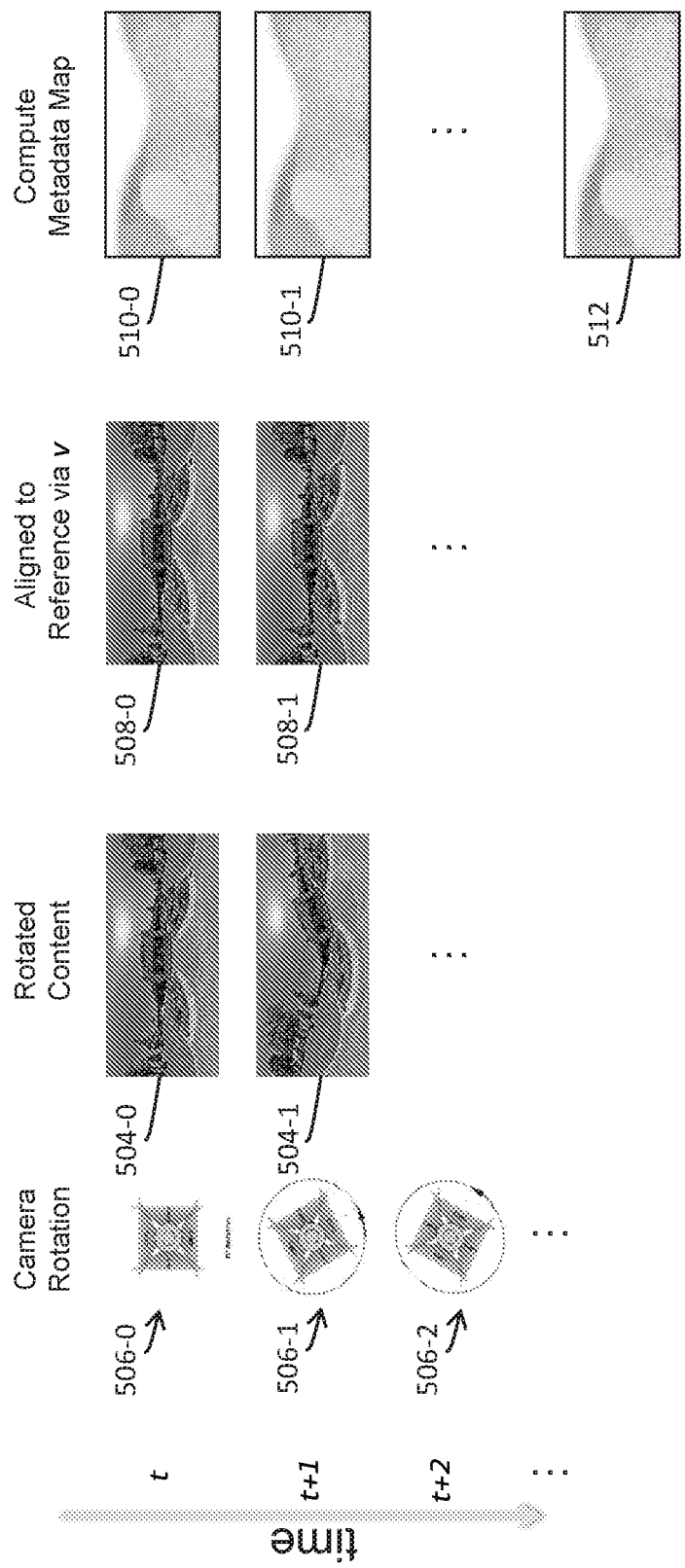
FIG. 5C illustrates an example process of generating spherical maps of image metadata for a scene.

FIG. 5C illustrates an example process of generating spherical distributions of image metadata parameters (or spherical maps of image metadata) for a scene that comprises spherical images with shifts caused by translations and/or rotations of a camera system (e.g., 102 of FIG. 1A). In some embodiments, the camera system (102) is used to generate image data for spherical images (504-0, 504-1, etc.) indexed by different time values (or time points) such as t, t+1, t+2, etc. As the camera system (102) is rotated into different spatial angular positions (e.g., 506-0, 506-1, etc.) while the image data is being generated, the spherical images (e.g., 504-0, 504-1, etc.) comprises shifts (e.g., represented by angular vectors in the 3D space, represented by linear vectors in the 2D space, etc.) from one another. An image processing system as described herein can be configured to determine the shifts in the spherical images based on common features, invariant features depicted in the spherical images and/or based on sensor data collected for the camera system (102); transform/align, based on the determined shifts, the spherical images into intermediate spherical images (e.g., 508-0, 508-1, etc.); etc.

As transformations of the spherical images (e.g., 504-0, 504-1, etc.) into the intermediate spherical images (e.g., 508-0, 508-1, etc.) could introduce errors and/or artifacts (e.g., motion blur artifacts, etc.) in the intermediate spherical images (e.g., 508-0, 508-1, etc.), the spherical images (e.g., 504-0, 504-1, etc.) may be recorded or transmitted as images representing the scene. The intermediate spherical images (e.g., 508-0, 508-1, etc.) after transformation/alignment may be used to derive spherical distributions of image metadata parameters for the scene. For example, a spherical surface filter may be applied to (or convolved with) the intermediate spherical images (e.g., 508-0, 508-1, etc.) to derive a spherical distribution 512 of an image metadata parameter such as a spherical distribution of one or more of maximum, mid-tone, and minimum luminance values. In some embodiments, the spherical surface filter is applied to (or convolved with) each of the intermediate spherical images (e.g., 508-0, 508-1, etc.) to generate individual spherical distribution (e.g., 510-0, 510-1, etc.) of the image metadata parameter per image. The individual spherical distribution (e.g., 510-0, 510-1, etc.) of the image metadata parameter per image may be integrated, averaged, statistically processed, etc., over all images of the scene into the (overall) spherical distribution (512) of the image metadata parameter per scene.

Figure 5D:
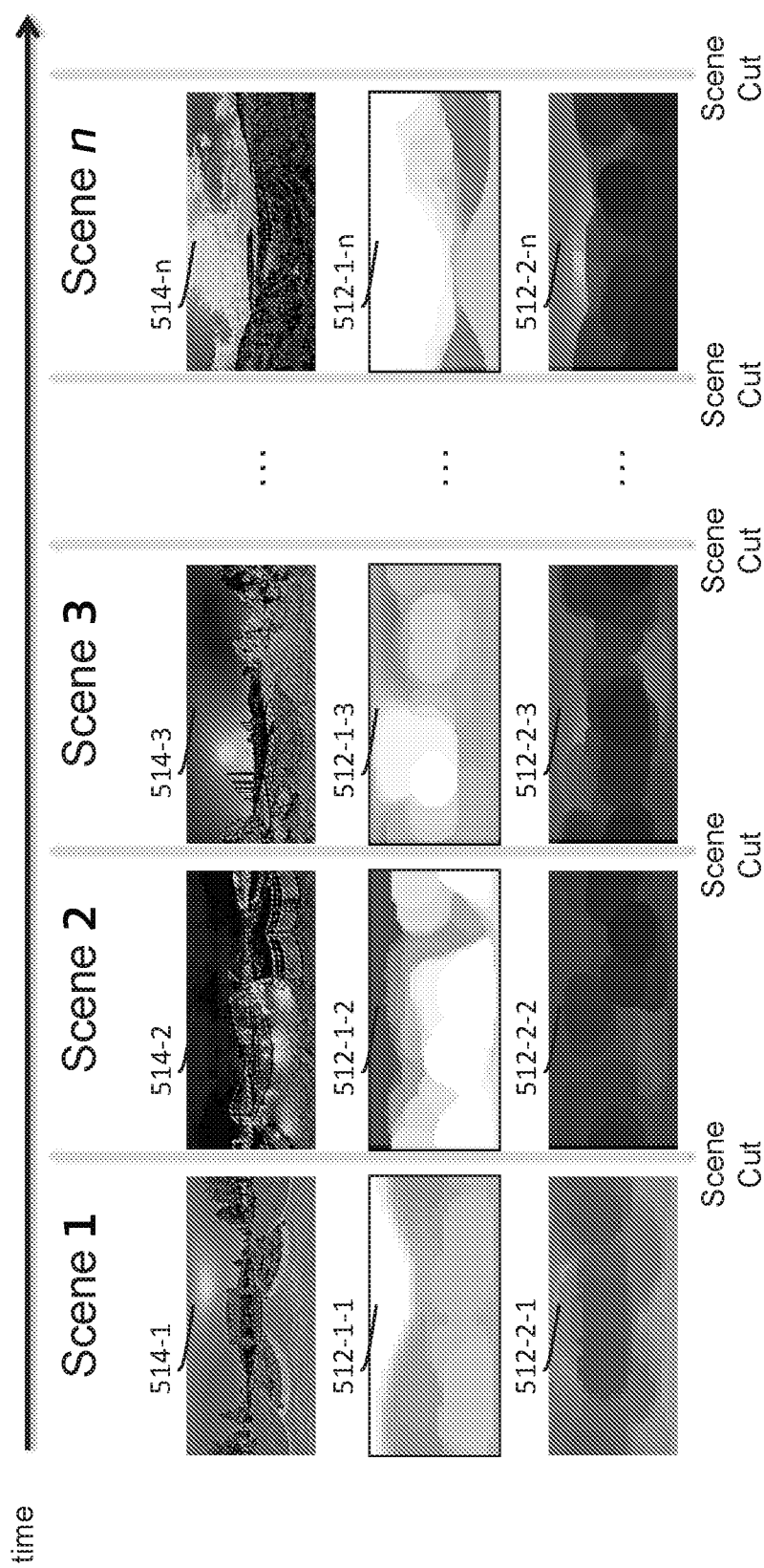
FIG. 5D illustrates example spherical maps of image metadata for a sequence of scenes over time.

FIG. 5D illustrates example spherical distributions of image metadata parameters (e.g., local maximum and minimum luminance values, etc.) for a sequence of scenes (e.g., 514-1, 514-2, 514-3, 514-n, etc.) over time. Each scene may be represented by a group of spherical images, such as video frames. Adjacent scenes in the sequence of scenes (e.g., 514-1, 514-2, 514-3, 514-n, etc.) may be separated by a plurality of time points (or time values) representing scene cuts.

A spherical distribution (e.g., 512-1-1, 512-2-1, etc.) of a specific image metadata parameter may be generated per scene for each individual scene (e.g., 514-1, etc.) in the sequence of scenes (e.g., 514-1, 514-2, 514-3, 514-n, etc.), thereby forming a sequence of spherical distributions (e.g., 512-1-1 through 512-1-n, 512-2-1 through 512-2-n, etc.) of the specific image metadata parameter each of which correspond to a different scene in the sequence of scenes (e.g., 514-1, 514-2, 514-3, 514-n, etc.).

8. Generating Image Metadata Values for Changing Viewports

Some or all of a spherical distribution (e.g., 512-1-1, etc.) of an image metadata parameter may be delivered/transmitted/stored along with some or all of spherical images of a scene and/or some or all of viewport images of spherical images of the scene to downstream devices as a part of image metadata per scene independent of translations and/or rotations in content creation of the scene (e.g., 514-1, etc.).

Figure 6A:
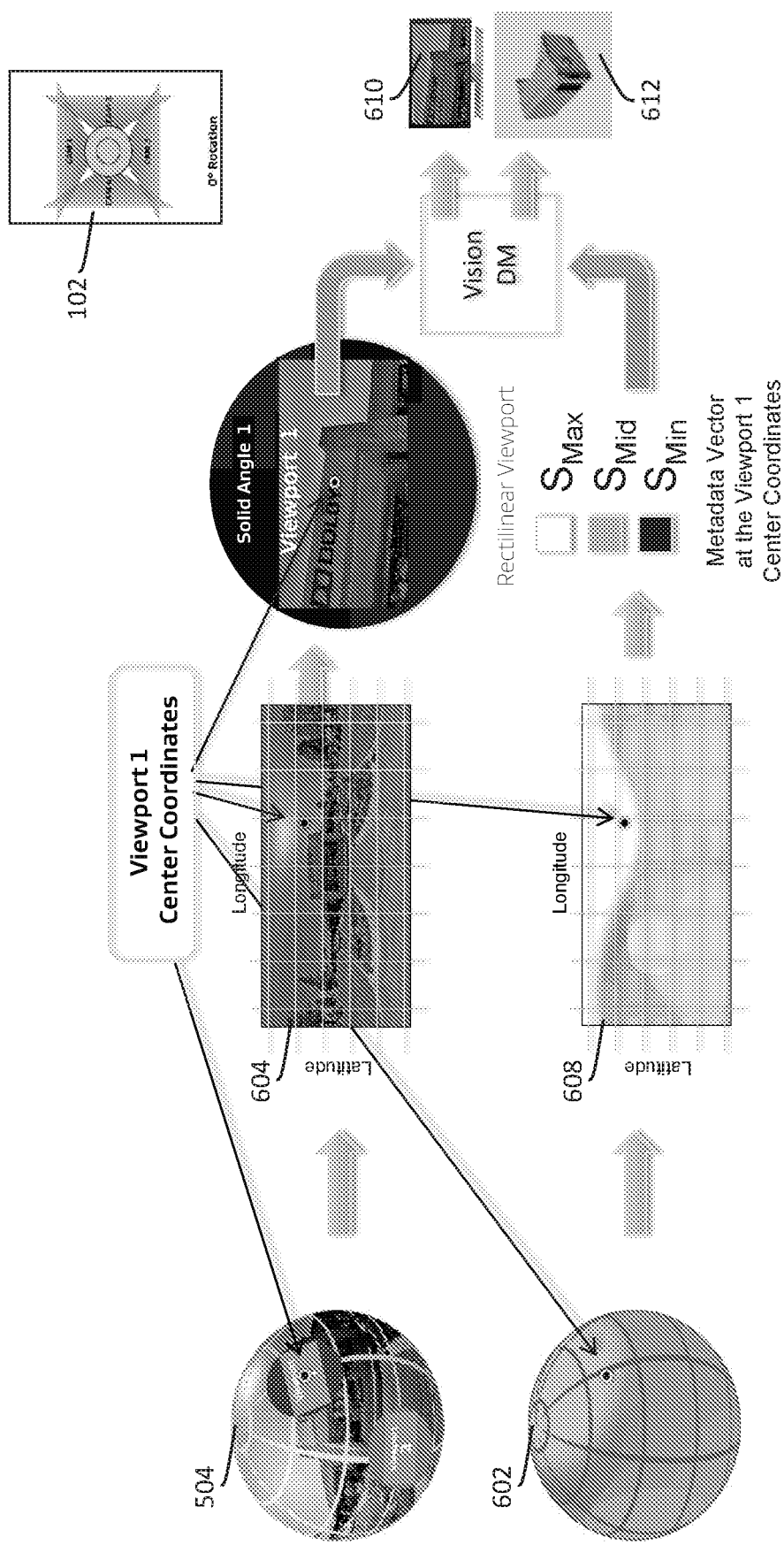
FIG. 6A and FIG. 6B illustrate example applications of a spherical map of image metadata in image processing operations.

FIG. 6A illustrates an example application of a spherical map 602 of image metadata in image processing operations such as display management (DM) operations for vision applications (e.g., virtual reality, augmented reality, etc.), etc. The spherical map may represent a spherical distribution of an image metadata vector comprising one or more vector components. Each of the vector components represents a spatially varying image metadata parameter such as a maximum luminance value $s_{max}$, a mid-tone luminance value $s_{mid}$, a minimum luminance value $s_{min}$, etc., in the spherical distribution.

In some embodiments, a spherical image 504 may be created by a camera system (e.g., 102 of FIG. 1A, etc.) with a content creation coordinate system that has no rotation (or a 0 degree rotation) with respect to a reference coordinate system (e.g., a universal reference coordinate system, a relative reference coordinate system, a content creation coordinate system at a specific reference location with a specific spatial orientation, etc.) that is defined independent of rotations of the camera system (102). As used herein, "a coordinate system independent of rotations of a camera system" means that the coordinate system does not rotate with the camera system while the camera system undergoes the rotations. Techniques as described herein can be used to support at least two types of VR capture. For the first type of VR imagery capture, a VR rig (e.g., comprising a camera system to capture imagery for VR display applications) is mounted on a tripod, typically on the ground, and thus fixed to a scene coordinate system (e.g., a coordinate system stationary in the scene, etc.). For the second type of VR imagery capture, a go-pro rig (e.g., comprising a camera system to capture imagery for VR display applications) is mounted in a helmet, and may rotate relative to the scene coordinate system. These and other coordinate systems can be used a reference coordinate system as described herein. For the purpose of illustration, the spherical map (602) that represents the spherical distribution of the image metadata vector—which may comprise the maximum, mid-tone, and minimum luminance values as vector components—may be created (e.g., by spherical surface filters, etc.) with respect to the reference coordinate system. Additionally, optionally, or alternatively, the spherical image (504) and the spherical map (602) may be represented in projections 604 and 608, respectively.

In some embodiments, viewport center coordinates, sizes, an aspect ratio, etc., of a viewport (denoted as "viewport 1"), which may be a rectilinear viewport for the purpose of illustration, in a solid angle (denoted as "solid angle 1") can be defined or determined by an image processing system as described herein, for example, based on one or more parameters collected via an input controller, a helmet movement tracker, face tracker, eye or facial feature scanner, etc.

The viewport center coordinates, sizes, aspect ratio, etc., of viewport 1 may be used to extract image data for viewport 1. For example, values of the spherically arranged pixels of a subset of spherically arranged pixels of the spherical image (504) that are located in viewport 1 of the spherical image (504) may be extracted from the spherical image (504). These spherically arranged pixels located in viewport 1 may correspond to spatial locations on the spherical image (504) with their positions (e.g., represented by combinations of longitude and latitude, etc.) in viewport 1. The spherically arranged pixel values of viewport 1 may represent luminance component values, chroma component values, RGB component values, YCbCr component values, YDzDx component values, etc., at these spatial locations within viewport 1 of the spherical image (504), as derived from image data captured by a camera system (e.g., 102 of FIG. 1A, etc.).

The viewport center coordinates as represented by a combination of a latitude value and a longitude value may be used to look up an image metadata vector at the viewport center coordinates of the spherical map—602 or 608, the latter of which may be a projection of the former. The image metadata vector as looked up in the spherical map (602) at the viewport center coordinates of viewport 1 may comprise a maximum luminance value $s_{max}$, a mid-tone luminance value $s_{mid}$ and a minimum luminance value $s_{min}$. For the purpose of illustration only, the spherical map (602) is generated with a filter kernel that is sufficiently large as to cover the entire viewport; the image processing system may set this image metadata vector ($s_{max}$, $s_{mid}$ and $s_{min}$) as the overall (per viewport) image metadata vector (comprising the overall maximum luminance value $S_{max}$, the overall mid-tone luminance value $S_{mid}$ and the overall minimum luminance value $S_{min}$) for viewport 1. FIG. 6E illustrates an example viewport (e.g., viewport 1). In some operational scenarios, a user may wear an HMD (e.g., 612) with a left-eye display (e.g., 622 of FIG. 6E, tilted/rotated 30 degrees from a face horizontal axis 624, etc.) and a right-eye display (not shown in FIG. 6E). The user's left eye may have a left-eye FOV that includes a left-eye only FOV portion 620-1, an overlapped FOV portion 620-3, etc. The user's right eye may have a right-eye FOV that includes a right-eye only FOV portion 620-2, the overlapped FOV portion (620-3), etc. In some embodiments, a HMD display system as described herein may provide to the HMD (612) a left-eye viewport (comprising imagery information and globally set metadata values such as 714 of FIG. 7A, etc.) with a left-eye FOV of an oblong shape. In an example, the left-eye viewport as provided to the HMD (612) has an oblong shape matching an aspect ratio (e.g., 1:1.28) of the left-eye display (622). In another example, the left-eye viewport as provided to the HMD (612) has a FOV of a distorted oblong shape not matching the aspect ratio (e.g., 1:1.28) of the left-eye display (622); the distorted oblong shape may be (additionally, optionally, or alternatively) configured to cover the left-eye FOV that includes the left-eye only FOV portion (620-1) and the overlapped FOV portion (620-3). Similarly, in some embodiments, the HMD display system may provide to the HMD (612) a right-eye viewport (comprising imagery information and globally set metadata values such as 714 of FIG. 7A, etc.) with a right-eye FOV of an oblong shape. In an example, the right-eye viewport as provided to the HMD (612) has an oblong shape matching an aspect ratio (e.g., 1:1.28) of the right-eye display. In another example, the right-eye viewport as provided to the HMD (612) has a FOV of a distorted oblong shape not matching the aspect ratio (e.g., 1:1.28) of the right-eye display; the distorted oblong shape may be (additionally, optionally, or alternatively) configured to cover the right-eye FOV that includes the right-eye only FOV portion (620-2) and the overlapped FOV portion (620-3).

The extracted spherically arranged pixels for viewport 1 and the overall image metadata vector looked up for viewport 1 may be provided to a display manager (denoted as "Vision DM" in FIG. 6A) to perform image processing operations in an imaging or display application. In an example, the display manager may be configured with information about capabilities of a display device (e.g., a television 610, an HMD 612, etc.). Such capabilities include Dynamic Range, bit-depth, color gamut, FOV, etc. Based at least in part on the information about capabilities of the display device (e.g., the television 610, the HMD 612, etc.), the extracted spherically arranged pixels in viewport 1, and the image metadata vector looked up from the spherical map (602 or 608), the display manager may optimally adapt (or content-map) the spherically arranged pixel values of viewport 1, which may be of a relatively high dynamic range, to codewords or drive values of a dynamic range supported by the display device (e.g., the television 610, the HMD 612, etc.).

Figure 6B:
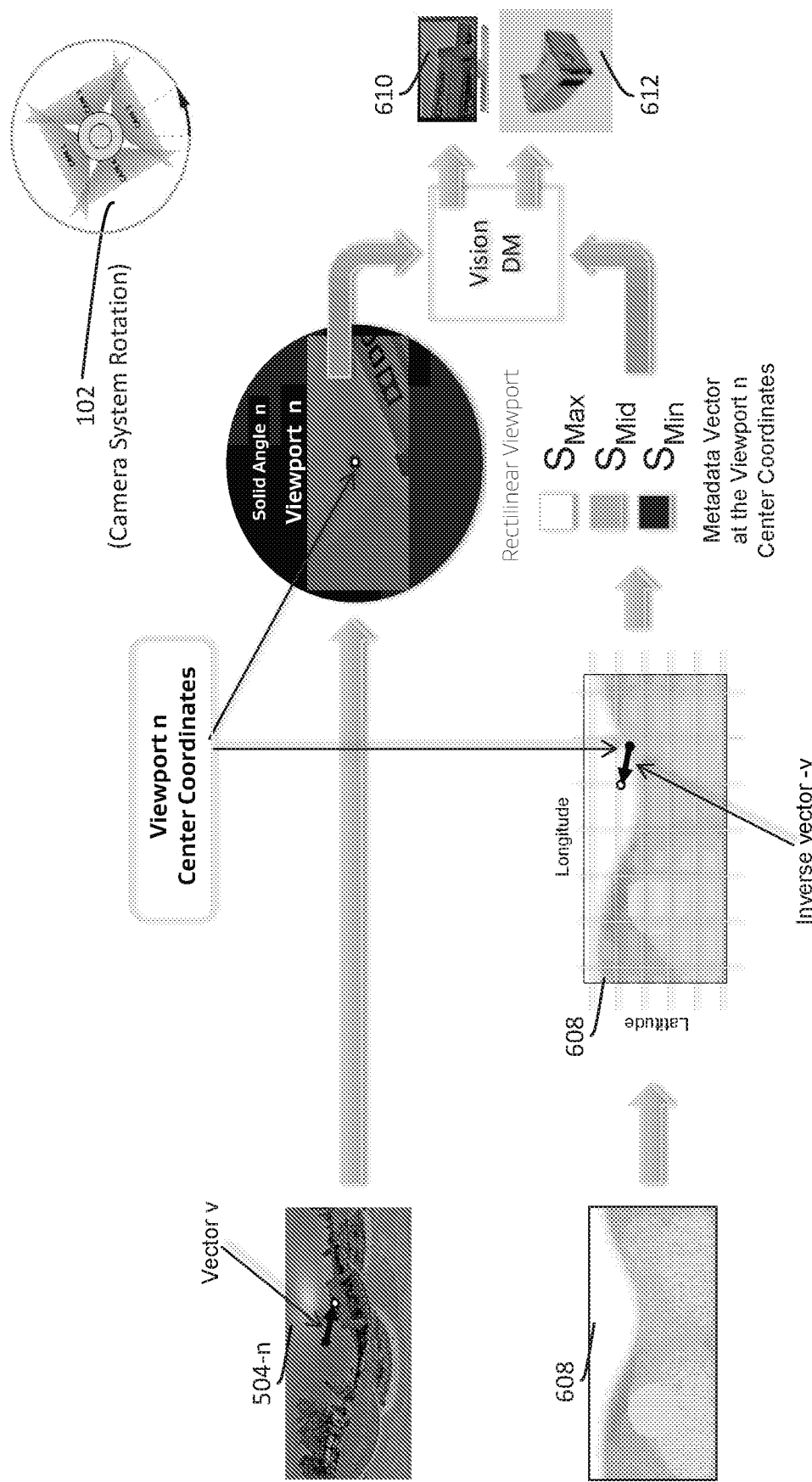

FIG. 6B illustrates another example application of a spherical map (e.g., 608, etc.) of image metadata in image processing operations such as display management (DM) operations for imaging and display applications (e.g., virtual reality, augmented reality, etc.), etc.

In some embodiments, a spherical image 504-$n$ may be created by a camera system (e.g., 102 of FIG. 1A, etc.) with a content creation coordinate system that has a rotation (e.g., a 30 degree rotation, etc.) with respect to a reference coordinate system that is defined independent of rotations of the camera system (102). The spherical map (608) that represents a spherical distribution of the image metadata vector—which may comprise the maximum, mid-tone, and minimum luminance values as vector components—may be created (e.g., by spherical surface filters, etc.) with respect to the reference coordinate system. The spherical map (608) for the spherical image (504-$n$) may be the same as the spherical map (602 or 608) of FIG. 6A, if the spherical map (608) is defined for a scene that includes both the spherical image 504 of FIG. 6A and the spherical image 504-$n$ of FIG. 6B. Additionally, optionally, or alternatively, the spherical image (504-$n$) and the spherical map (608) may be represented in projections in the 2D space, respectively.

In some embodiment, viewport center coordinates, sizes, an aspect ratio, etc., of a viewport n (which may be a rectilinear viewport for the purpose of illustration) in a solid angle n can be defined or determined by an image processing system as described herein, for example, based on one or more parameters collected via an input controller, a head movement tracker, face tracker, eye or facial feature scanner, etc.

In some embodiments, the viewport center coordinates, sizes, aspect ratio, etc., of viewport n may be defined in the same content creation coordinate system in which the spherical image (504-$n$) is generated and recorded. The viewport center coordinates, sizes, aspect ratio, etc., of viewport n may be used to extract image data for viewport n from the spherical image (504-$n$). For example, spherically arranged pixel values in a subset of spherically arranged pixels of the spherical image (504-$n$) that are located in viewport n may be extracted from the spherical image (504-$n$).

In some embodiments, the spherical map (608) may be defined in the reference coordinate system. Some or all of the viewport center coordinates, sizes, aspect ratio, etc., of viewport n, as defined in the content creation coordinate system, may be converted through one or more (content creation to reference) transformations into transformed viewport center coordinates, transformed sizes, transformed aspect ratio, etc., as defined in the reference coordinate system. The one or more transformations may be performed using one or more of matrixes, vector fields, etc. In a non-limiting example as illustrated in FIG. 6B, the one or more transformations may be represented by vectors.

For example, the center of viewport n in the spherical image (504-$n$) defined in the content creation coordinate system may have been shifted or transformed by a vector v from a point defined in the reference coordinate system. The vector v may be a part of a vector field representing one or more transformations from the reference coordinate system to the content creation coordinate system. Given the coordinates of the center of viewport n in the spherical image (504-$n$) as defined in the content creation coordinate system, the transformed coordinates of the center of viewport n in the reference coordinate system may be obtained by using the inverse (e.g., an inverse shift, etc.) of the vector v, which may be a part of an inverse vector field representing the one or more (content creation to reference) transformations.

The transformed viewport center coordinates as represented by a combination of a latitude value and a longitude value may be used to look up an image metadata vector at the viewport center coordinates of the spherical distribution of the image metadata vector in the spherical map (608). The image metadata vector at the viewport center coordinates of viewport n may comprise a maximum luminance value $s_{max}$, a mid-tone luminance value $s_{mid}$ and a minimum luminance value $s_{min}$. For the purpose of illustration only, the spherical map (608) is generated with a filter kernel that is sufficiently large as to cover the entire viewport; the image processing system may set this image metadata vector ($s_{max}$, $s_{mid}$ and $s_{min}$) as the overall (per viewport) image metadata vector (comprising the overall maximum luminance value $S_{max}$, the overall mid-tone luminance value $S_{mid}$ and the overall minimum luminance value $S_{min}$) for viewport n.

The extracted spherically arranged pixels for viewport n and the image metadata vector looked up for viewport n may be provided to the display manager. Based at least in part on the information about capabilities of the display device (e.g., the television 610, the HMD 612, etc.), the extracted spherically arranged pixels in viewport n, and the image metadata vector looked up from the spherical map (608), the display manager may optimally adapt (or content-map) the spherically arranged pixel values of viewport n, which may be of a relatively high dynamic range, to codewords or drive values of a dynamic range supported by the display device (e.g., the television 610, the HMD 612, etc.). Also, the FOV of the display is used to determine the subset of pixels to be sent to the display.

A spherical map of image metadata such as 608 of FIG. 6A or FIG. 6B, etc., for one or more spherical images may or may not have the same spatial resolution as that of the one or more spherical images. In some embodiments, the spherical map of image metadata is of a spatial resolution (e.g., much, 50%, 80%, etc.) lower than that of the spherical images for which the spherical map of image metadata is generated. One or more downsampling operations may be used to generate one or more spatial resolutions for a spherical map that are lower than that of spherical images from and/or for which the spherical map is derived. Additionally, optionally, or alternatively, filter kernel sizes may be configurable. In operational scenarios in which bandwidth or bitrate budget for transmitting image metadata is relatively limited, a relatively low spatial resolution (e.g., 12 view angle points for a sphere, etc.) may be used for a spherical map. Further, a cloud-based system may generate a spherical map with a relatively large filter kernel to cover some or all viewport sizes and/or viewport aspect ratios. In operational scenarios in which bandwidth or bitrate budget for transmitting image metadata is relatively large, a relatively high spatial resolution (e.g., 360×180 view angle points for a sphere, etc.) may be used for a spherical map. Further, a cloud-based system may generate a spherical map of a relatively high resolution with a relatively small filter kernel to provide multiple view angle pixels in a viewport. A spherical map of a coarser resolution may generate more (quantization) error in image metadata values derived for a viewport that are less accurate than a spherical map of a finer resolution.

The cloud-based system may only need to look up in the spherical map based on coordinates (e.g., center coordinates, etc.) of a viewport to generate an overall value of an image metadata parameter for a viewport. If only adjacent local values of the image metadata parameters are available, interpolation may be used to estimate or determine a value for the coordinates of the viewport, which can then be used as an overall value of the image metadata parameter for the viewport.

In some embodiments, a sphere such as a unit sphere, etc., may be divided into a plurality of view angle pixels. A spherical map of image metadata as described herein may be represented by a plurality of image metadata values at the plurality of view angle pixels of the sphere. Each view angle pixel in the plurality of view angle pixels may represent a distinct solid angle of the sphere (e.g., $4\pi$ steradians or 360 degrees of longitudes times 180 degrees of latitudes for a whole sphere, $2\pi$ a steradians or 360 degrees of longitudes times 90 degrees of latitudes for a half sphere, etc.). A solid angle represented by a view angle pixel in the plurality of view angle pixels may be in unit of steradians or in unit of a latitude range and a longitude range. In some embodiments, solid angles represented by two view angle pixels in the plurality of view angle pixels may be equal in steradians. In some embodiments, solid angles represented by two view angle pixels in the plurality of view angle pixels may be unequal in steradians. In some embodiments, two view angle pixels in the plurality of view angle pixels may be equal in units of degrees (e.g., equal to 1 degree of longitude times 1 degree of latitude, etc.). In some embodiments, two view angle pixels in the plurality of view angle pixels may be unequal in units of degrees (e.g., equal to 1 degree of longitude times 2 degree of latitude, etc.).

Each of the view angle pixels may be associated with a point spread function (PSF). The smallest size of a view angle pixel may be the size of a spherically arranged pixel of spherical images. The total number of view angle pixels included in a spherical distribution of a locally varying image metadata parameter is indicative of a spatial resolution of the spherical distribution. In some embodiments, the total number of the view angle pixels, or the spatial resolution, may be set based on one or more factors such as types of vision applications, bandwidth/bitrate budgets, computing capabilities/resources/loads of recipient devices, computing capabilities, resources, loads, etc., of image processing systems and/or computer networks, etc.

For the purpose of illustration, it has been illustrated that a viewport image metadata vector, a viewport image metadata value such as a maximum luminance value $S_{max}$, etc., for a viewport image can be determined based on looking up a spherical map of image metadata (e.g., comprising locally varying maximum luminance value $s_{max}$, etc.) for an image metadata vector, a viewport image metadata value, etc., at a viewport center of the viewport image represented by viewport center coordinates, possibly with spatial transformations (e.g., matrixes, vector fields, inverses, etc.) to take into account the difference between a content creation coordinate system and a reference coordinate system. It should be noted, however, that in various embodiments, a viewport image metadata vector, a viewport image metadata value, etc., for a viewport image may be determined based on looking up a spherical map of image metadata for a plurality of image metadata vectors, a plurality of image metadata values, etc., at different view angles of the viewport image, each of the different view angles corresponding to a view angle pixel of the spherical map of image metadata. The plurality of image metadata vectors, the plurality of image metadata values, etc., at the different view angles of the viewport image, as looked up from the spherical map of image metadata, can then be combined (e.g., integrated, statistically processed, selected, filtered, etc.) into the viewport image metadata vector, the viewport image metadata value, etc., for the viewport image.

FIG. 6C illustrates an example determination of an image metadata vector for a viewport image of a spherical image based on a plurality of image metadata vectors looked up at a plurality of view angle pixels in a spherical map of image metadata. In some embodiments, the spherical map of image metadata may comprise 360 times 180 view angle pixels, each of the view angle pixels being equal to one (1) latitude degree times one (1) longitude degree. Given a viewport, an image processing system as described herein may be configured to identify all view angle pixels present in the spherical map of image metadata that are visible in the viewport's field of view with the viewport's aspect ratio, or other non-rectangular or non-elliptical shape info. These view angle pixels visible in the viewport may correspond to view angles located in a bounded box 614, which demarcates the viewport on the spherical image. Additionally, optionally, or alternatively, these view angle pixels may form a distribution of spatial locations in a rectilinear representation 616 of the viewport (image).

In some embodiments, the spherically arranged pixels may be rendered on a spherical display, a display in a cave-like setting, a display comprising walls around a viewer, etc.

In some embodiments, the spherically arranged pixels in the viewport may be first adjusted with a lens correction operation that maps the spherically arranged pixels in a sphere or in a projection of a sphere into a rectilinear image frame. The rectilinear image frame mapped by the lens correction operation from the viewport may be of any of a wide variety of planar shapes, rectangles, heart shapes, irregular shapes, curved shapes, etc. Pixel values in the rectilinear image may be directly mapped from, indirectly interpolated between, spherically arranged pixels of the spherical image. Some image processing operations (e.g., content mapping operations, color mapping operations, tone mapping operations, etc.) as described herein may be performed on spherically arranged pixels of a spherical image before lens correction is applied to generate a rectilinear image for a view port. Some image processing operations (e.g., content mapping operations, color mapping operations, tone mapping operations, etc.) as described herein may be performed on pixels of a rectilinear image after lens correction for a view port.

A single image metadata value may be computed for an image metadata vector, an image metadata parameter (e.g., the maximum luminance value, the minimum luminance value, the mid-tone luminance value, etc.), etc., in the viewport image, for example, by computing the image metadata vector, the image metadata parameter, etc., over all the view angle pixels of metadata included in the viewport image. For example, a single maximum luminance value $S_{max}$ may be computed for the viewport image of FIG. 6C by determining the largest value among all maximum luminance values at all the view angle pixels included in the viewport image. A single minimum luminance value $S_{min}$ may be computed for the viewport image of FIG. 6C by determining the smallest value among all minimum luminance values at all the view angle pixels included in the viewport image. A single mid-tone luminance value $S_{mid}$ may be computed for the viewport image of FIG. 6C by determining the average value among all mid-tone luminance values at all the view angle pixels included in the viewport image. These luminance values $S_{max}$, $S_{mid}$ and $S_{mid}$ may be together included in an image metadata vector for the viewport image to be transmitted to the display (e.g., a television 610, an HMD 612, etc.).

9. Temporal Dampening

Figure 6D:
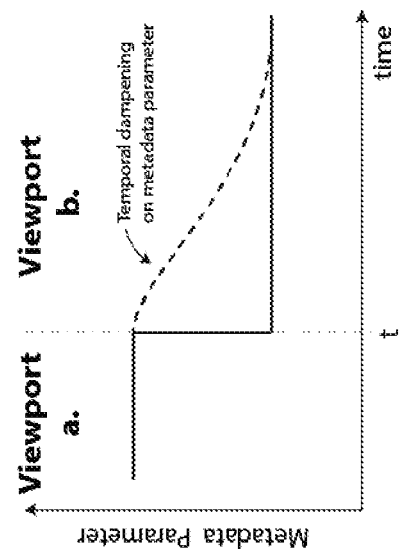
FIG. 6D illustrates example dampening of image metadata.
Figure 6D:
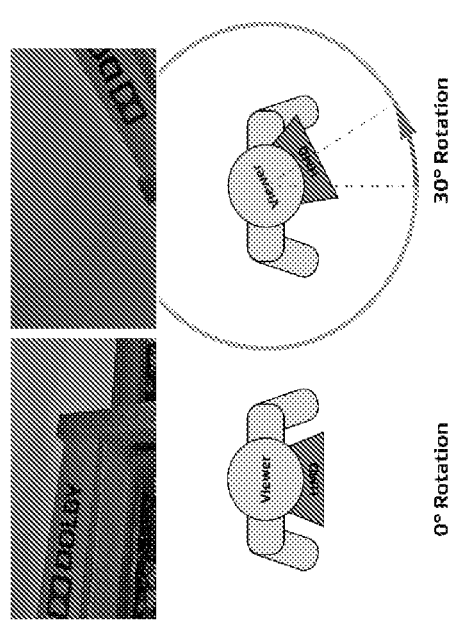
Figure 6D:
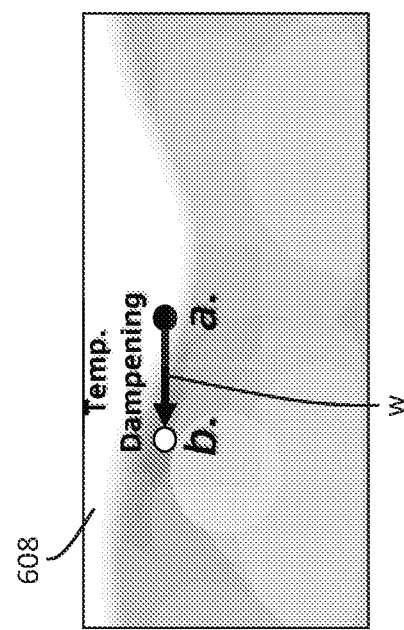

FIG. 6D illustrates example dampening of image metadata as viewports to spherical images change significantly in a scene. For example, for a first time interval up to a time value t, a first viewport (denoted as "a") may be used to render first viewport images of first spherical images in the scene. For a second time interval starting at time value t, a second different viewport (denoted as "b") may be used to render second viewport images of second spherical images in the scene.

The viewport change at the time value t may be caused by a physical rotation of a camera system (e.g., 102 of FIG. 1A, etc.) at an (initial) image content creation time, a physical rotation of a viewer's HMD (e.g., 612, etc.) at a final image rendering time, or by a logical rotation specified by a user (e.g., a director, a producer, etc.) in between the image content creation time and the image rendering time. By way of example but not limitation, when a viewer in a VR application rotates his/her head, different viewports with different viewport centers may be selected for viewing spherical images of the scene. Some of the viewports may be very dark (e.g., away from the Sun, etc.), while some others of the viewports may be very bright (e.g., the Sun is part of an image in a viewport, etc.). The HVS cannot instantly adjust to different luminance levels. An image processing system as described herein can estimate, determine, or select a duration needed for eye adaptation when a difference of (e.g., maximum, average, etc.) luminance values in viewport images exceeds a certain configurable eye adaptation threshold, and smoothly transition (e.g., maximum, average, etc.) luminance vales in a set of consecutive viewport images.

In some operational scenarios, however, an image processing system as described herein does not perform HVS adaptation operations as previously described, even if spatial image metadata (e.g., 714 of FIG. 7A) may have been changed to smoothly transition luminance values in a set of consecutive viewport images. The spatial image metadata used to perform the HVS adaptation operations can be deliberately overwritten due to artistic decisions. Thus, the spatial metadata does not have to match the HVS response if so desired by the artistic intent.

As illustrated in FIG. 6D, the image processing system can look up in a spherical map (e.g., 608, static for the scene, slowly varying in the scene, etc.) of an image metadata parameter (e.g., maximum luminance, average luminance, etc.) for the scene to determine a (e.g., single) first value of the image metadata parameter for the first viewport ("a") based on first viewport coordinates, etc., of the first viewport ("a"). Similarly, the image processing system looks up in the spherical map (608) of an image metadata parameter (e.g., maximum luminance, average luminance, etc.) for the scene to determine a (e.g., single) second value of the image metadata parameter for the second viewport ("b") based on second viewport coordinates, etc., of the second viewport ("b"). The first value may be computed based on first local values of the image metadata parameters at or near a first location (latitude and longitude values in the first viewport "a" of the spherical map (108)) of the spherical map (608), and the second value may be computed based on second local values of the image metadata parameters at a second location (latitude and longitude values in the second viewport "b" of the spherical map (108)) of the spherical map (608) that is significantly shifted from the first location by a shift vector w (e.g., of a relatively large magnitude, etc.). The greater the difference (e.g., in terms of rotational angles, in terms of vectors, etc.) in terms of view angles between the first viewport ("a") and the second viewport ("b"), the more likely to have significant difference between the first value of the image metadata parameter and the second value of the image metadata parameter.

In some embodiments, in response to determining that the first value of the image metadata parameter for the first time interval is considerably different from (e.g., as measured by whether the difference is greater than a parameter value threshold, etc.) the second value of the image metadata parameter for the (e.g., immediately following) second time interval, the image processing system may use temporal dampening to smoothen the transition in values of the image metadata parameter. Under the temporal dampening, the image metadata parameter may be transitioned relatively gradually from the first value to the second value in a dampening time interval, rather than transition immediately and abruptly at or near the time value t when the viewport change occurs. In some embodiments, the time length of the temporal dampening, or the dampening time interval, may be a temporal variable that depends at least in part on (e.g., monolithically increase with, etc.) the difference between the first value and the second value (e.g., a first maximum luminance value and a second maximum luminance value, etc.). Besides the difference between the first value and the second value, other factors such as those related to mean levels of luminance values in the viewport images, light adaptation times (e.g., short term light adaptation constants, etc.) of the human perceptual system, etc., may also be used to determine or set the dampening time interval.

10. Image Processing and Image Rendering

Figure 7A:
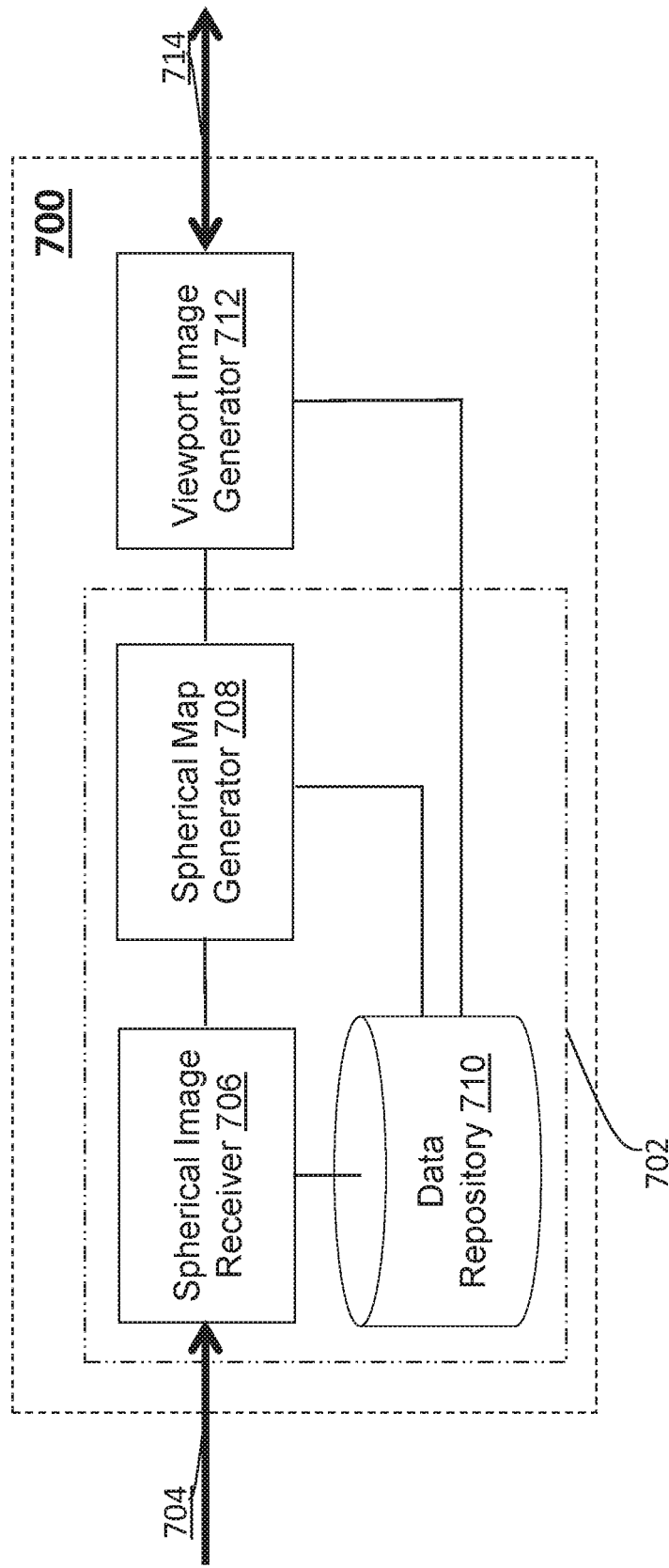
FIG. 7A through FIG. 7C illustrate example image processing or rendering systems.

FIG. 7A illustrates an example image processing system 700 that comprises a spherical image processor 702, a viewport image generator 712, etc. In some embodiments, the spherical image processor (702) comprises a spherical image receiver 706, a spherical map generator 708, a data repository 710, etc. Some or all of the components of the image processing system (700) may be implemented by one or more devices, modules, units, etc., in software, hardware, a combination of software and hardware, etc.

In some embodiments, the spherical image receiver (706) comprises software, hardware, a combination of software and hardware, etc., configured to receive a panorama video stream (e.g., 108 of FIG. 1A, etc.) in a data flow 704 from an image content creation system (e.g., 100 of FIG. 1A, etc.); decode spherical images from the panorama video stream (108); etc.

In some embodiments, the spherical map generator (708) comprises software, hardware, a combination of software and hardware, etc., configured to generate spherical maps of image metadata for and/or from the received spherical images. In some embodiments, the spherical maps of image metadata may be generated by convolving spherical surface filters with the spherical images. The spherical maps of image metadata may be, but are not limited to only, scene-based.

In some embodiments, the data repository (710) represents one or more databases, one or more data storage units/modules/devices, etc., configured to support operations such as storing, updating, retrieving, deleting, etc., with respect to some or all of the spherical images, the spherical maps of image metadata, etc.

In some embodiments, the viewport image generator (708) comprises software, hardware, a combination of software and hardware, etc., configured to receive (e.g., via a data flow 714, etc.) viewport center coordinates, sizes, aspect ratios, etc., of viewports (e.g., over time, etc.) to the spherical images; extract spherically arranged pixels from the spherical images for the viewports; extract locally varying image metadata parameter values from the spherical maps of image metadata at view angle pixels located in the viewports; compute per-viewport image metadata parameter values from the locally varying image metadata parameter values; generate, based on the extracted the spherically arranged pixel values and the per-viewport image metadata (computed), viewport image data for the viewports of spherical images; etc. The viewport image data may be outputted in a data flow (e.g., 714 of FIG. 7A, transmitted directly, transmitted via intermediate devices, etc.) to one or more target display devices, stored on tangible storage media, etc. Pixel values in the viewport image data for the viewports may be any of: the extracted spherically arranged pixel values, interpolated pixel values, lens-corrected pixel values, rectilinear pixel values, pixel values adapted for curved displays, etc.

Additionally, optionally, or alternatively, some or all of image processing operations such as image rotation determination, image alignment analysis, scene cut detections, transformation between coordinate systems, temporal dampening, display management, content mapping, color mapping, field-of-view management, etc., may be performed by the image processing system (700).

The image processing system (700) may be used to support real time vision applications, near-real-time vision applications, non-real-time vision applications, virtual reality, augmented reality, helmet mounted display applications, heads up display applications, games, 2D display applications, 3D display applications, multi-view display applications, etc. For example, some or all of spherical images, spherical maps of image metadata, viewport parameters (e.g., viewport center coordinates, aspect ratios, etc.), per-viewport image metadata, viewport image data, etc., are generated or accessed by the image processing system (700) in real time, in near real time, etc.

Figure 7B:
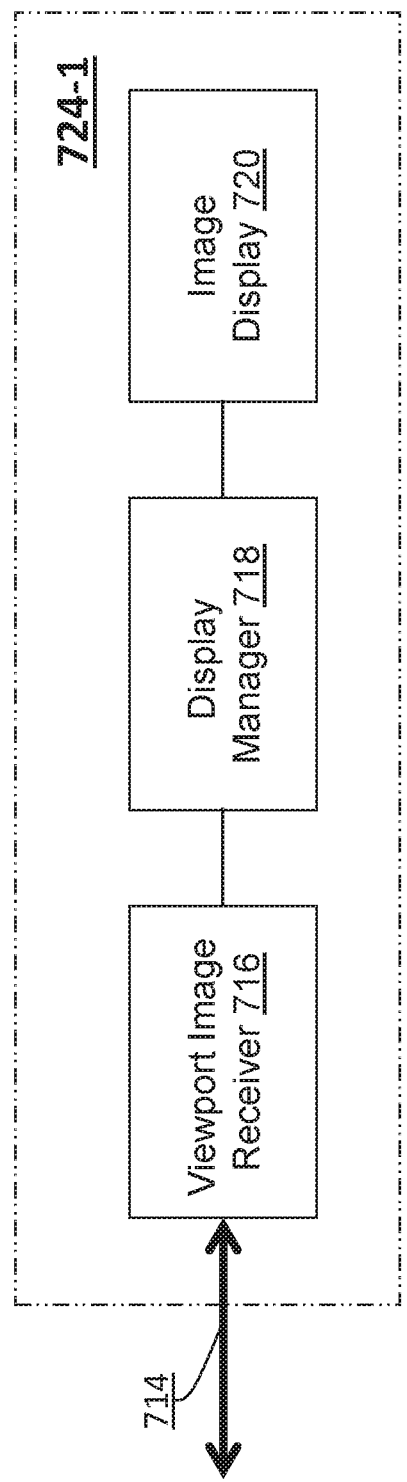

FIG. 7B illustrates an example image rendering system 724-1 that comprises a viewport image retriever 716, a display manager 718, an image display 720, etc. Some or all of the components of the image rendering system (724-1) may be implemented by one or more devices, modules, units, etc., in software, hardware, a combination of software and hardware, etc.

In some embodiments, the viewport image retriever (716) comprises software, hardware, a combination of software and hardware, etc., configured to send (e.g., via a data flow 714, etc.) viewport center coordinates, sizes, aspect ratios, etc., of viewports (e.g., over time, etc.) to spherical images; receive viewport image data (e.g., encoded in a received video bitstream, etc.) of viewport images in the viewports to the spherical images in a data flow 714 from an image processing system (e.g., 700 of FIG. 7A, etc.); determine pixel values of viewport images and per-view image metadata parameter values for the viewport images, etc.

In some embodiments, the display manager (718) comprises software, hardware, a combination of software and hardware, etc., configured to perform display management operations on the pixel values of viewport images by transforming/adapting, based at least in part on the per-view image metadata parameter values for the viewport images, the pixel values of viewport images into transformed pixel values of the viewport images, where the viewport images with the transformed pixel values are optimized for rendering on an image display 720; output the transformed pixel values of the viewport images to the image display (720) for rendering; etc.

Additionally, optionally, or alternatively, some or all of image rendering operations such as face detection, head tracking, motion detection, position detection, rotation determination, transformation between coordinate systems, temporal dampening of time-varying image parameters, any other temporal manipulation of image parameters, display management, content mapping, tone mapping, color mapping, field-of-view management, prediction, navigations through mouse, trackball, keyboard, foot tracker, actual body motion, etc., may be performed by the image rendering system (724-1).

The image rendering system (724-1) may be used to support real time vision applications, near-real-time vision applications, non-real-time vision applications, virtual reality, augmented reality, helmet mounted display applications, heads up display applications, games, 2D display applications, 3D display applications, multi-view display applications, etc. For example, some or all of spherical images, spherical maps of image metadata, viewport parameters (e.g., viewport center coordinates, aspect ratios, etc.), per-viewport image metadata, viewport image data, etc., are generated or accessed by the image rendering system (724-1) in real time, in near real time, etc.

Techniques as described herein can be implemented in a variety of system architectures. Some or all image processing operations as described herein can be implemented by one or more of cloud-based image processing systems, image processing systems collocated with or incorporated into image rendering systems, image rendering systems, target display devices, etc. Based on one or more factors such as types of vision applications, bandwidth/bitrate budgets, computing capabilities/resources/loads of recipient devices, computing capabilities, resources, loads, etc., of image processing systems and/or computer networks, etc., some image processing operations can be performed by an image processing system, while some other image processing operations can be performed by an image rendering system, a target display device, etc.

Figure 7C:
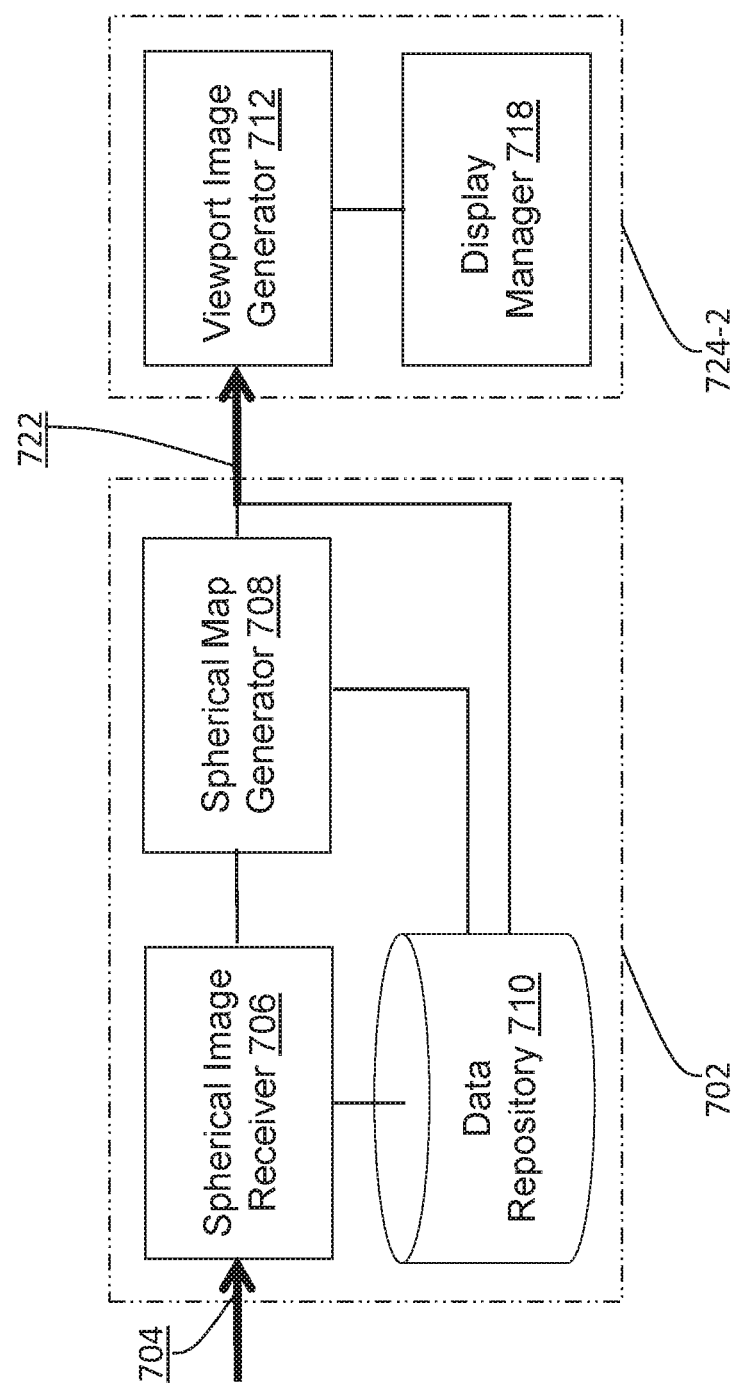

FIG. 7C illustrates an example configuration in which a viewport image generator (e.g., 712, etc.) is incorporated into an image rendering system 724-2. As in FIG. 7A, a spherical image processor (e.g., 702) of FIG. 7B may comprise a spherical image receiver 706, a spherical map generator 708, a data repository 710, etc. The spherical image processor (702) may represent an image processing system that communicates with the downstream image rendering system (724-2). Some or all of the components of the spherical image processor (702) and/or the image rendering system (724-2) may be implemented by one or more devices, modules, units, etc., in software, hardware, a combination of software and hardware, etc.

In some embodiments, the spherical image processor (702) is configured to output spherical images and spherical maps of image metadata in a data flow 722 to downstream devices one of which may be the image rendering system (724-2).

In some embodiments, the image rendering device (724-2), or the viewport image generator (712) therein, comprises software, hardware, a combination of software and hardware, etc., configured to determine (e.g., motion sensors, etc.) viewport center coordinates, sizes, aspect ratios, etc., of viewports (e.g., over time, etc.) to the spherical images; extract spherically arranged pixels from the spherical images for the viewports; extract locally varying image metadata parameter values from the spherical maps of image metadata at view angle pixels located in the viewports; compute per-viewport image metadata parameter values from the locally varying image metadata parameter values; generate, based on the extracted the spherically arranged pixel values and the per-viewport image metadata (computed), viewport image data for the viewports of spherical images; etc. Pixel values in the viewport image data for the viewports may be any of: the extracted spherically arranged pixel values, interpolated pixel values, lens-corrected pixel values, rectilinear pixel values, pixel values adapted for curved displays, etc.

In some embodiments, the image rendering device (724-2), or the display manager (718) therein, comprises software, hardware, a combination of software and hardware, etc., configured to perform display management operations on the pixel values of viewport images by transforming/adapting, based at least in part on the per-view image metadata parameter values for the viewport images, the pixel values of viewport images into transformed pixel values of the viewport images, where the viewport images with the transformed pixel values are optimized for rendering an image on display 720; output the transformed pixel values of the viewport images to the image display (720) for rendering; etc.

11. Example Process Flows

Figure 8A:
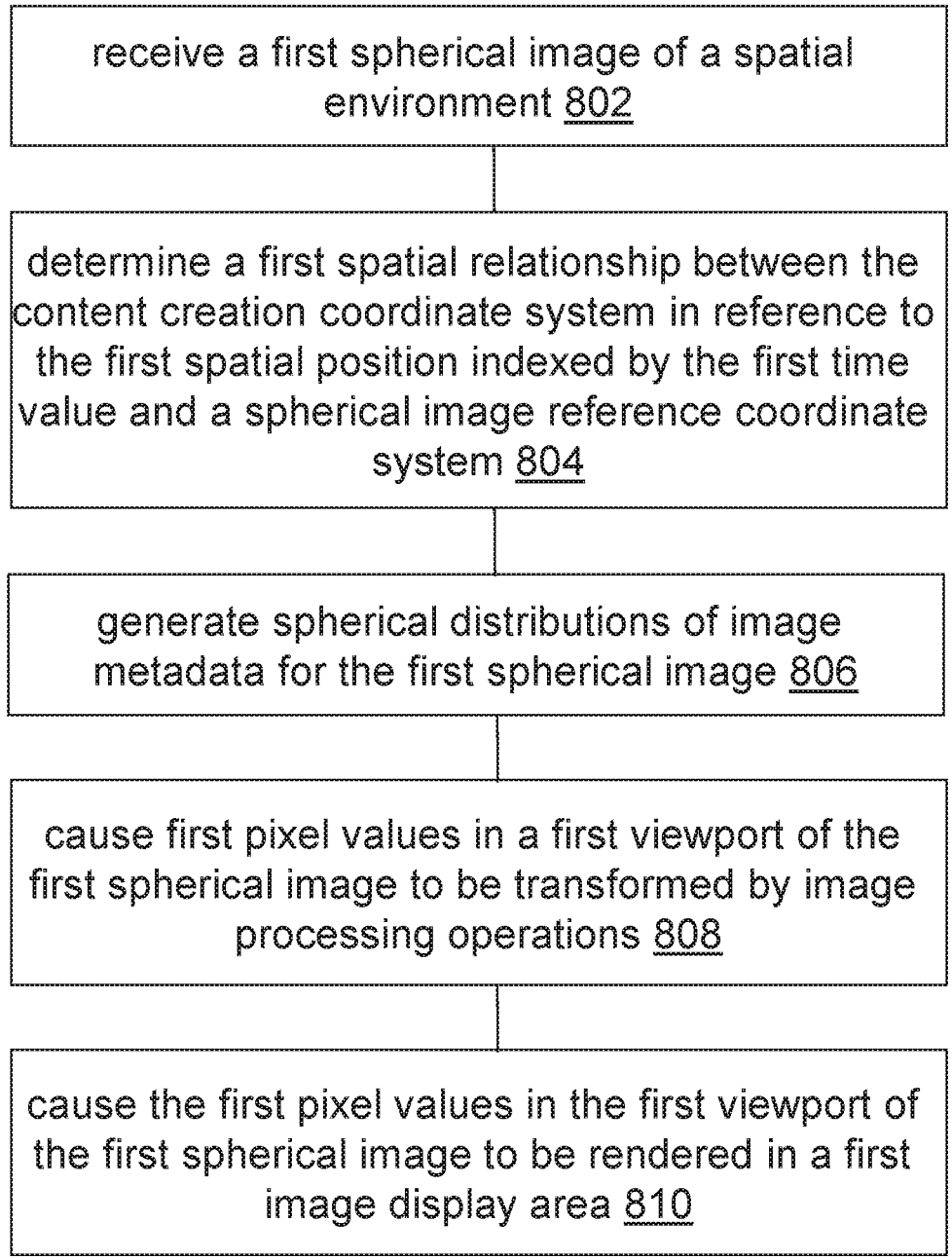
FIG. 8A and FIG. 8B illustrate example process flows.

FIG. 8A illustrates an example process flow according to an example embodiment of the present invention. In some example embodiments, one or more computing devices or components may perform this process flow. In block 802, a spherical image processor (e.g., 702 of FIG. 7A or FIG. 7C, etc.) receives a first spherical image of a spatial environment, the first spherical image containing first spherically arranged pixel values indexed by a first time value, the first spherical image being represented in a content creation coordinate system in reference to a first spatial position in the spatial environment, the first spatial position being indexed by the first time value.

In block 804, the spherical image processor (702) determines a first spatial relationship between the content creation coordinate system in reference to the first spatial position indexed by the first time value and a spherical image reference coordinate system.

In block 806, the spherical image processor (702) generates, based at least in part on (a) the first spatial relationship between the content creation coordinate system in reference to the first spatial position indexed by the first time value and the spherical image reference coordinate system and (b) the first spherically arranged pixel values in the first spherical image, one or more spherical distributions of image metadata for the first spherical image.

In block 808, the spherical image processor (702) causes first pixel values in a first viewport of the first spherical image to be transformed by one or more image processing operations, the image processing operations using at least one first viewport specific parameter, the at least one first viewport specific parameter being derived specifically for the first viewport based at least in part on the one or more spherical distributions of image metadata for the first spherical image.

In block 810, the spherical image processor (702) causes the first pixel values, as transformed by the one or more image processing operations, in the first viewport of the first spherical image to be rendered in a first image display area.

In an embodiment, the spherical image processor (702) is further configured to generate an output video signal encoded with (a) the first spherically arranged pixel values of the first spherical image and (b) the one or more spherical distributions of image metadata for the first spherical image.

In an embodiment, the spatial environment represents one or more of: spatial environment, artificial environment, a movie studio, a stationary scene, a moving scene, a rotating scene, etc. In an embodiment, the first spatial position corresponds to a position of a camera system used to acquire image data from which the first spherical image is derived.

In an embodiment, the spherical image processor (702) is further configured to perform: generating one or more individual video streams with one or more directional cameras, each of the one or more directional cameras covering at least a part of an overall solid angle; generating, based on the one or more individual video streams, an overall video stream of spherical images, the overall video stream of spherical images comprising the first spherical image; etc.

In an embodiment, the one or more spherical distributions of image metadata are represented by one or more of: image metadata matrix elements, image metadata vector elements, etc.

In an embodiment, the first spatial relationship between the content creation coordinate system in reference to the first spatial position and the spherical image reference coordinate system is determined at least in part based on one or more of position sensor data, rotation sensor data, motion sensor data, computed image alignment data, etc.

In an embodiment, the one or more spherical distributions of image metadata are for two or more spherical images that include the first spherical image and a second spherical image; the one or more spherical distributions of image metadata are generated, further based at least in part on (c) a second spatial relationship between the content creation coordinate system in reference to a second spatial position indexed by a second time value and the spherical image reference coordinate system and (d) second spherically arranged pixel values in the second spherical image represented in the content creation coordination system in reference to the second spatial position; and the spherical image processor (702) is further configured to: cause the second pixel values in a second viewport of the second spherical image to be transformed by one or more second image processing operations, the one or more second image processing operations using at least one second viewport specific parameter that is derived specifically for the second viewport based at least in part on the one or more spherical distributions of image metadata; causing the second pixel values, as transformed by the one or more second image processing operations, in the second viewport of the second spherical image to be rendered in the first image display area; etc.

In an embodiment, the first spatial relationship is represented by a first spatial transformation from the spherical image reference coordinate system; the second spatial relationship is represented by a second different spatial transformation from the spherical image reference coordinate system.

In an embodiment, the first spherical image and the second spherical image are in a group of spherical images representing a scene; the one or more spherical distributions of image metadata are shared by all spherical images in the group of spherical images for deriving viewport specific parameters for viewports of all the spherical images in the scene.

In an embodiment, the content creation coordinate system is stationary relative to a camera system used to acquire image data based on which the first spherical image is generated.

In an embodiment, the camera system comprises one, two, or more directional cameras.

In an embodiment, the first spherical image covers a sphere that corresponds to a solid angle as viewed in reference to the first spatial position; the solid angle is one of: a hemisphere, a full sphere, a portion of sphere, a contiguous solid angle, or one or more disjoint solid angles.

In an embodiment, the first spherical image is represented in the content creation coordinate system with one of: a sphere, a hemisphere, any other small circle of a sphere, a projected two-dimensional planar surface, a cubic map, or a two-dimensional non-planar surface; the one or more spherical distributions of image metadata are represented in the spherical image reference coordinate system with one of: a sphere, a hemisphere, any other small circle of a sphere, a projected two-dimensional planar surface, a cubic map, or a two-dimensional non-planar surface.

In an embodiment, the content creation coordinate system in reference to the first spatial position coincides with the spherical image reference coordinate system.

In an embodiment, the content creation coordinate system in reference to the second spatial position does not coincide with the spherical image reference coordinate system.

In an embodiment, the content creation coordinate system has spatial relationships that vary over time relative to the spherical image reference coordinate system.

In an embodiment, the one or more spherical distributions of image metadata comprise a spherical distribution of an image property computed based on the first pixel values of the first spherical image; a spatial resolution of the spherical distribution of image metadata is lower than a spatial resolution of the first spherical image. In an embodiment, the image property represents one of: a minimum value, a maximum value, a mean value, a percentile value, or a statistical value.

In an embodiment, the one or more spherical distributions of image metadata are spatially coextensive with the first spherical image.

In an embodiment, the one or more spherical distributions of image metadata are generated by applying a metadata generation filter to spherically arranged pixel values of one or more spherical images; the one or more spherical images include the first spherical image; the spatial resolution of the one or more spherical distributions of image metadata is dependent on a filter kernel size of the metadata generation filter. In an embodiment, the filter kernel size represents a diameter of a spherical area on the first spherical image. In an embodiment, the metadata generation filter represents one of: a spherical surface filter, an ellipsoidal filter, a filter with constant-spherical-area-size, a filter with constant-size solid angles, a filter with axes that vary in size with latitudes and longitudes of underlying support areas, a non-rectilinear filter, etc.

In an embodiment, the one or more spherical distributions of image metadata comprise a spherical distribution of an image property; the spherical distribution of the image property represents mappings from a plurality of spherical areas to a plurality of values of the image property. In an embodiment, each spherical area in the plurality of spherical areas is indexed by an individual spherical coordinate combination of latitude and longitude in a plurality of spherical coordinate combinations of latitudes and longitudes.

Figure 8B:
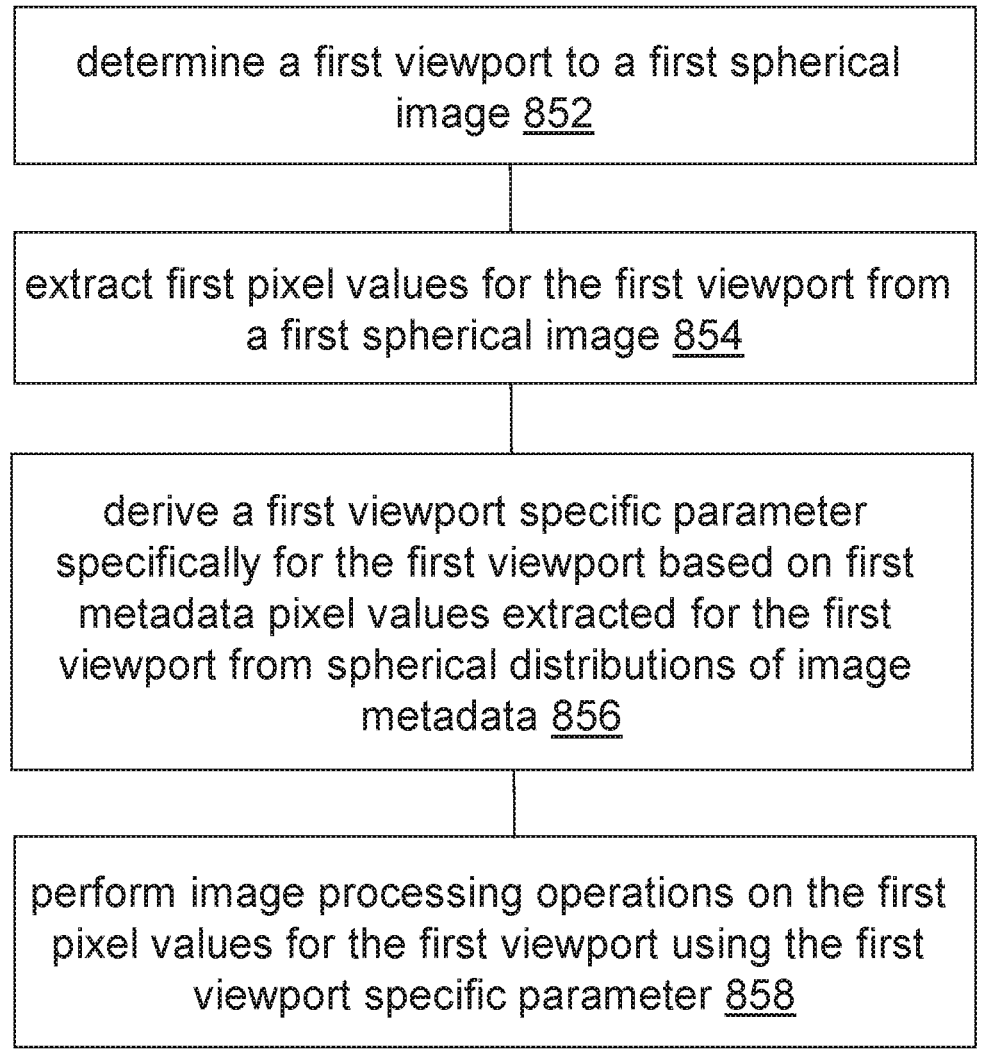

FIG. 8B illustrates an example process flow according to an example embodiment of the present invention. In some example embodiments, one or more computing devices or components may perform this process flow. In block 852, a viewport image generator (e.g., 712 of FIG. 7A, FIG. 7B or FIG. 7C, etc.) determines a first viewport to a first spherical image.

In block 854, the viewport image generator (712) extracts first pixel values for the first viewport from a first spherical image.

In block 856, the viewport image generator (712) derives at least one first viewport specific parameter specifically for the first viewport based at least in part on first metadata pixel values extracted for the first viewport from one or more spherical distributions of image metadata, the spherical distribution of image metadata being generated at least in part for the first spherical image.

In block 858, the viewport image generator (712) performs one or more image processing operations on the first pixel values for the first viewport using the at least one first viewport specific parameter.

In an embodiment, a center of the first viewport corresponds to a view angle of a viewer relative to the first spherical image.

In an embodiment, the first pixel values in the first viewport of the first spherical image are transformed by the one or more image processing operations; the viewport image generator (712) is further configured to cause the first pixel values, as transformed by the one or more image processing operations, in the first viewport of the first spherical image to be rendered in a first image display area.

In an embodiment, the first viewport is determined based on one or more of: (a) a geometric size of a first image display area, (b) an aspect ratio of a first image display area, (c) a geometric shape type of a first image display area, (d) an imaginary position of a first image display area in a spatial environment in which image data used to generate the first spherical image is acquired, (e) an imaginary orientation of a first image display area in the spatial environment, (f) a focal length of an imaginary lens used by a viewer to view the first viewport, (g) one or more geometric properties of a first image display area, etc.

In an embodiment, the one or more image processing operations performed on the first image data for the first viewport using the at least one first viewport specific parameters include one or more of: (a) filtering, (b) content mapping, (c) inverse mapping, (d) codeword reshaping, (e) perceptual quantization, (f) image data transformation, (g) projection into fisheye image representation, (h) projection into image representation with barrel distortion, (i) projection into a rectilinear image representation, (j) projection into any other map projection (k) interpolation, (l) extrapolation, (m) display management operations, (n) temporal dampening of time-varying image parameters, etc.

In an embodiment, the one or more image processing operations performed on the first image data for the first viewport using the at least one first viewport specific parameters include one or more operations in one or more of: (a) virtual reality applications, (b) augmented reality applications, (c) display applications operated through media players, (d) display applications for televisions, (e) display applications operated with head-mounted displays, (f) display applications for cavernous displays, (g) display applications for computer games, (h) display applications for computer-based simulations, (i) display applications for computer-based multimedia presentations, (j) media authoring applications, (k) media editing applications, (l) media production applications, (m) media adaptation applications (e.g., auto cropping 4 k images on large viewing angle TVs to 2 k screen on small viewing angle TVs, etc.), a heads-up display device, etc.

In an embodiment, the viewport image generator (712) is further configured to perform: determining a second viewport of the first spherical image; extracting second image data for the second viewport from the first spherical image; deriving at least one second viewport specific parameter specifically for the second viewport based at least in part on second image metadata extracted for the second viewport from the spherical distribution of image metadata; performing one or more second image processing operations on the second image data for the second viewport using the at least one second viewport specific parameters; etc. In an embodiment, the second viewport is dependent on the first viewport.

In an embodiment, the first viewport represents one or more displays of: a mobile phone device, a video game device, a television, a tablet computer, a heads up display (HUD) device, a dashboard display device, a display device operating in conjunction with one or more computers, a display device in a vehicle, a movie studio system, a home theater system, a color grading system, etc.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

12. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
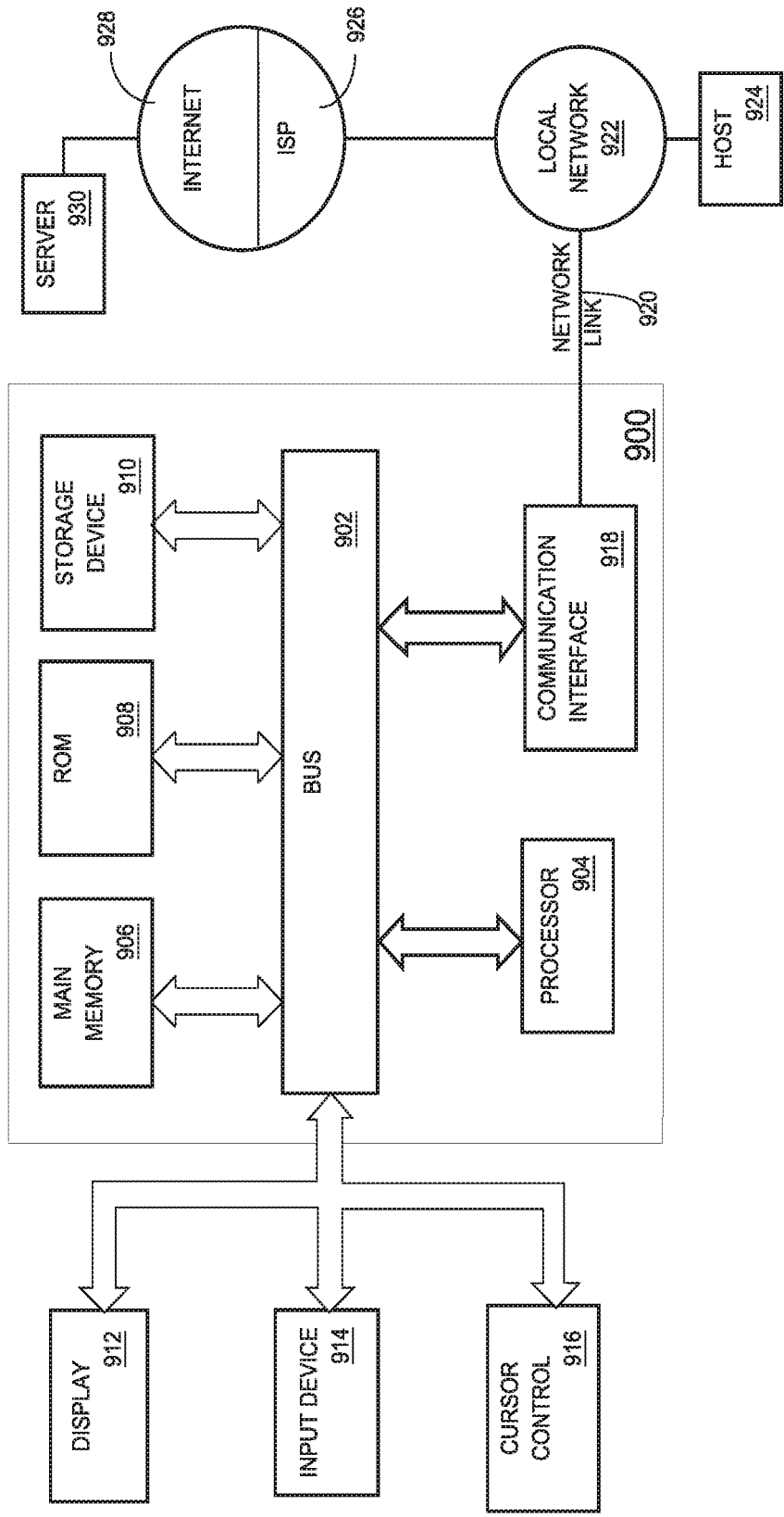
FIG. 9 illustrates an example hardware platform on which a computer or a computing device as described herein may be implemented.

For example, FIG. 9 is a block diagram that illustrates a computer system 900 upon which an example embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904.

A storage device 910, such as a magnetic disk or optical disk, solid state RAM, is provided and coupled to bus 902 for storing information and instructions.

Computer system 900 may be coupled via bus 902 to a display 912, such as a liquid crystal display, for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

13. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method, comprising:
  receiving a first spherical image of a spatial environment, the first spherical image containing first spherically arranged pixel values indexed by a first time value, the first spherical image being represented in a content creation coordinate system in reference to a first spatial position in the spatial environment, the first spatial position being indexed by the first time value;

determining a first spatial relationship between the content creation coordinate system in reference to the first spatial position indexed by the first time value and a spherical image reference coordinate system;

generating, based at least in part on (a) the first spatial relationship between the content creation coordinate system in reference to the first spatial position indexed by the first time value and the spherical image reference coordinate system and (b) the first spherically arranged pixel values in the first spherical image, one or more spherical distributions of image metadata for the first spherical image;

causing first pixel values in a first viewport of the first spherical image to be transformed by one or more image processing operations, the image processing operations using at least one first viewport specific parameter, the at least one first viewport specific parameter being derived specifically for the first viewport based at least in part on the one or more spherical distributions of image metadata for the first spherical image;

causing the first pixel values, as transformed by the one or more image processing operations, in the first viewport of the first spherical image to be rendered in a first image display area;

wherein the method is performed by one or more computing devices.

EEE 2. The method of EEE 1, further comprising generating an output video signal encoded with (a) the first spherically arranged pixel values of the first spherical image and (b) the one or more spherical distributions of image metadata for the first spherical image.

EEE 3. The method of EEE 1, wherein the spatial environment represents one or more of: spatial environment, artificial environment, a movie studio, a stationary scene, a moving scene, or a rotating scene.

EEE 4. The method of EEE 1, wherein the first spatial position corresponds to a position of a camera system used to acquire image data from which the first spherical image is derived.

EEE 5. The method of EEE 1, further comprising:

generating one or more individual video streams with one or more directional cameras, each of the one or more directional cameras covering at least a part of an overall solid angle;

generating, based on the one or more individual video streams, an overall video stream of spherical images, the overall video stream of spherical images comprising the first spherical image.

EEE 6. The method of EEE 1, wherein the one or more spherical distributions of image metadata are represented by one or more of: image metadata matrix elements, or image metadata vector elements.

EEE 7. The method of EEE 1, wherein the first spatial relationship between the content creation coordinate system in reference to the first spatial position and the spherical image reference coordinate system is determined at least in part based on one or more of position sensor data, rotation sensor data, motion sensor data, or computed image alignment data.

EEE 8. The method of EEE 1, wherein the one or more spherical distributions of image metadata are for two or more spherical images that include the first spherical image and a second spherical image; wherein the one or more spherical distributions of image metadata are generated, further based at least in part on (c) a second spatial relationship between the content creation coordinate system in reference to a second spatial position indexed by a second time value and the spherical image reference coordinate system and (d) second spherical pixel values in the second spherical image represented in the content creation coordination system in reference to the second spatial position; and the method further comprising:

causing second pixel values in a second viewport of the second spherical image to be transformed by one or more second image processing operations, the one or more second image processing operations using at least one second viewport specific parameter that is derived specifically for the second viewport based at least in part on the one or more spherical distributions of image metadata;

causing the second pixel values, as transformed by the one or more second image processing operations, in the second viewport of the second spherical image to be rendered in the first image display area.

EEE 9. The method of EEE 8, wherein the first spatial relationship is represented by a first spatial transformation from the spherical image reference coordinate system, and wherein the second spatial relationship is represented by a second different spatial transformation from the spherical image reference coordinate system.

EEE 10. The method of EEE 8, wherein the first spherical image and the second spherical image are in a group of spherical images representing a scene, and wherein the one or more spherical distributions of image metadata are shared by all spherical images in the group of spherical images for deriving viewport specific parameters for viewports of all the spherical images in the scene.

EEE 11. The method of EEE 1, wherein the content creation coordinate system is stationary relative to a camera system used to acquire image data based on which the first spherical image is generated.

EEE 12. The method of EEE 11, wherein the camera system comprises one, two, or more directional cameras.

EEE 13. The method of EEE 1, wherein the first spherical image covers a sphere that corresponds to a solid angle as viewed in reference to the first spatial position, and wherein the solid angle is one of: a hemisphere, a full sphere, a portion of sphere, a contiguous solid angle, or one or more disjoint solid angles.

EEE 14. The method of EEE 1, wherein the first spherical image is represented in the content creation coordinate system with one of: a sphere, a hemisphere, a projected two-dimensional planar surface, a cubic map, or a two-dimensional non-planar surface; and wherein the one or more spherical distributions of image metadata are represented in the spherical image reference coordinate system with one of: a sphere, a hemisphere, a projected two-dimensional planar surface, a cubic map, or a two-dimensional non-planar surface.

EEE 15. The method of EEE 1, wherein the content creation coordinate system in reference to the first spatial position coincides with the spherical image reference coordinate system.

EEE 16. The method of EEE 1, wherein the content creation coordinate system in reference to the second spatial position does not coincide with the spherical image reference coordinate system.

EEE 17. The method of EEE 1, wherein the content creation coordinate system has spatial relationships that vary over time relative to the spherical image reference coordinate system.

EEE 18. The method of EEE 1, wherein the one or more spherical distributions of image metadata comprise a spherical distribution of an image property computed based on the first pixel values of the first spherical image, and wherein a spatial resolution of the spherical distribution of image metadata is lower than a spatial resolution of the first spherical image.

EEE 19. The method of EEE 18, wherein the image property represents one of: a minimum value, a maximum value, a mean value, a percentile value, or a statistical value.

EEE 20. The method of EEE 1, wherein the one or more spherical distributions of image metadata are spatially coextensive with the first spherical image.

EEE 21. The method of EEE 1, wherein the one or more spherical distributions of image metadata are generated by applying a metadata generation filter to spherically arranged pixel values of one or more spherical images, wherein the one or more spherical images include the first spherical image, and wherein the spatial resolution of the one or more spherical distributions of image metadata is dependent on a filter kernel size of the metadata generation filter.

EEE 22. The method of EEE 21, wherein the filter kernel size represents a diameter of a circular area on the first spherical image.

EEE 23. The method of EEE 21, wherein the metadata generation filter represents one of: a spherical surface filter, an ellipsoidal filter, a filter with constant-spherical-area-size, a filter with constant-size solid angles, a filter that varies in size as a function of latitude, longitude or rotation of underlying support areas, or a non-rectilinear filter.

EEE 24. The method of EEE 1, wherein the one or more spherical distributions of image metadata comprise a spherical distribution of an image property, and wherein the spherical distribution of the image property represents mappings from a plurality of spherical areas to a plurality of values of the image property.

EEE 25. The method of EEE 24, wherein each spherical area in the plurality of spherical areas is indexed by an individual spherical coordinate combination of latitude, longitude and rotation in a plurality of spherical coordinate combinations of latitudes, longitudes and rotations.

EEE 26. A method, comprising:
  determining a first viewport to a first spherical image;
  extracting first pixel values for the first viewport from a first spherical image;
  deriving at least one first viewport specific parameter specifically for the first viewport based at least in part on first metadata pixel values extracted for the first viewport from one or more spherical distributions of image metadata, the spherical distribution of image metadata being generated at least in part for the first spherical image;
  performing one or more image processing operations on the first pixel values for the first viewport using the at least one first viewport specific parameter;
  wherein the method is performed by one or more computing devices.

EEE 27. The method of EEE 26, wherein a center of the first viewport corresponds to a view angle of a viewer relative to the first spherical image.

EEE 28. The method of EEE 26, wherein the first pixel values in the first viewport of the first spherical image are transformed by the one or more image processing operations; and the method further comprising causing the first pixel values, as transformed by the one or more image processing operations, in the first viewport of the first spherical image to be rendered in a first image display area.

EEE 29. The method of EEE 26, wherein the first viewport is determined based on one or more of: (a) a geometric size of a first image display area, (b) an aspect ratio of a first image display area, (c) a geometric shape type of a first image display area, (d) an imaginary position of a first image display area in a spatial environment in which image data used to generate the first spherical image is acquired, (e) an imaginary orientation of a first image display area in the spatial environment, (f) a focal length of an imaginary lens used by a viewer to view the first viewport, or (g) one or more geometric properties of a first image display area.

EEE 30. The method of EEE 26, wherein the one or more image processing operations performed on the first image data for the first viewport using the at least one first viewport specific parameters include one or more of: (a) filtering, (b) content mapping, (c) inverse mapping, (d) codeword reshaping, (e) re-quantization, (f) image data transformation, (g) projection into fisheye image representation, (h) projection into image representation with barrel distortion, (i) projection into a rectilinear image representation, (j) projection into any arbitrary map-projection (k) interpolation, (l) extrapolation, (m) display management operations, or (n) temporal dampening.

EEE 31. The method of EEE 26, wherein the one or more image processing operations performed on the first image data for the first viewport using the at least one first viewport specific parameters include one or more operations in one or more of: (a) virtual reality applications, (b) augmented reality applications, (c) display applications operated through media players, (d) display applications for televisions, (e) display applications operated with helmet-mounted displays, (f) display applications for cavernous displays, (g) display applications for computer games, (h) display applications for computer-based simulations, (i) display applications for computer-based multimedia presentations, (j) media authoring applications, (k) media editing applications, (l) media production applications, (m) media adaptation applications, or a heads-up display device.

EEE 32. The method of EEE 26, further comprising:
  determining a second viewport of the first spherical image;
  extracting second image data for the second viewport from the first spherical image;
  deriving at least one second viewport specific parameter specifically for the second viewport based at least in part on second image metadata extracted for the second viewport from the spherical distribution of image metadata;
  performing one or more second image processing operations on the second image data for the second viewport using the at least one second viewport specific parameters.

EEE 33. The method of EEE 26, wherein the first viewport represents one or more displays of: a mobile phone device, a video game device, a television, a tablet computer, a heads up display (HUD) device, a dashboard display device, a display device operating in conjunction with one or more computers, a display device in a vehicle, a movie studio system, a home theater system or a color grading system.

EEE 34. An apparatus performing any of the methods as recited in EEEs 1-33.

EEE 35. A system performing any of the methods as recited in EEEs 1-33.

EEE 36. A non-transitory computer readable storage medium, storing software instructions, which when executed by one or more processors cause performance of the method recited in any of EEEs 1-33.

EEE 37. A computing device comprising one or more processors and one or more storage media, storing a set of instructions, which when executed by one or more processors cause performance of the method recited in any of EEEs 1-33.

The invention claimed is:

1. A method, comprising:
receiving a first spherical image of a spatial environment, the first spherical image containing first spherically arranged pixel values indexed by a first time value, the first spherical image being represented in a content creation coordinate system in reference to a first spatial position in the spatial environment, the first spatial position being indexed by the first time value;
determining a first spatial relationship between the content creation coordinate system in reference to the first spatial position indexed by the first time value and a spherical image reference coordinate system;
generating, based at least in part on (a) the first spatial relationship between the content creation coordinate system in reference to the first spatial position indexed by the first time value and the spherical image reference coordinate system and (b) the first spherically arranged pixel values in the first spherical image, one or more spherical distributions of image metadata for the first spherical image;
causing first pixel values in a first viewport of the first spherical image to be transformed by one or more image processing operations, the image processing operations using at least one first viewport specific parameter, the at least one first viewport specific parameter being derived specifically for the first viewport based at least in part on the one or more spherical distributions of image metadata for the first spherical image;
causing the first pixel values, as transformed by the one or more image processing operations, in the first viewport of the first spherical image to be rendered in a first image display area;
wherein the method is performed by one or more computing devices.

2. The method of claim 1, further comprising generating an output video signal encoded with (a) the first spherically arranged pixel values of the first spherical image and (b) the one or more spherical distributions of image metadata for the first spherical image.

3. The method of claim 1, wherein the spatial environment represents one or more of: spatial environment, artificial environment, a movie studio, a stationary scene, a moving scene, or a rotating scene.

4. The method of claim 1, wherein the first spatial position corresponds to a position of a camera system used to acquire image data from which the first spherical image is derived.

5. The method of claim 1, further comprising:
generating one or more individual video streams with one or more directional cameras, each of the one or more directional cameras covering at least a part of an overall solid angle;
generating, based on the one or more individual video streams, an overall video stream of spherical images, the overall video stream of spherical images comprising the first spherical image.

6. The method of claim 1, wherein the one or more spherical distributions of image metadata are represented by one or more of: image metadata matrix elements, or image metadata vector elements.

7. The method of claim 1, wherein the first spatial relationship between the content creation coordinate system in reference to the first spatial position and the spherical image reference coordinate system is determined at least in part based on one or more of position sensor data, rotation sensor data, motion sensor data, or computed image alignment data.

8. The method of claim 1, wherein the one or more spherical distributions of image metadata are for two or more spherical images that include the first spherical image and a second spherical image; wherein the one or more spherical distributions of image metadata are generated, further based at least in part on (c) a second spatial relationship between the content creation coordinate system in reference to a second spatial position indexed by a second time value and the spherical image reference coordinate system and (d) second spherical pixel values in the second spherical image represented in the content creation coordination system in reference to the second spatial position; and the method further comprising:
causing second pixel values in a second viewport of the second spherical image to be transformed by one or more second image processing operations, the one or more second image processing operations using at least one second viewport specific parameter that is derived specifically for the second viewport based at least in part on the one or more spherical distributions of image metadata;
causing the second pixel values, as transformed by the one or more second image processing operations, in the second viewport of the second spherical image to be rendered in the first image display area.

9. The method of claim 8, wherein the first spatial relationship is represented by a first spatial transformation from the spherical image reference coordinate system, and wherein the second spatial relationship is represented by a second different spatial transformation from the spherical image reference coordinate system.

10. The method of claim 8, wherein the first spherical image and the second spherical image are in a group of spherical images representing a scene, and wherein the one or more spherical distributions of image metadata are shared by all spherical images in the group of spherical images for deriving viewport specific parameters for viewports of all the spherical images in the scene.

11. The method of claim 1, wherein the content creation coordinate system is stationary relative to a camera system used to acquire image data based on which the first spherical image is generated.

12. The method of claim 11, wherein the camera system comprises one, two, or more directional cameras.

13. A method, comprising:
determining a first viewport to a first spherical image;
extracting first pixel values for the first viewport from the first spherical image;
deriving at least one first viewport specific parameter specifically for the first viewport based at least in part on first metadata pixel values extracted for the first viewport from one or more spherical distributions of image metadata, the one or more spherical distributions of image metadata being generated at least in part for the first spherical image;

performing one or more image processing operations on the first pixel values for the first viewport using the at least one first viewport specific parameter;

wherein the one or more image processing operations include a tone mapping operation performed on the first pixel values based on a transfer function that is partly specified with the first viewport specific parameter;

wherein the method is performed by one or more computing devices.

14. The method of claim 13, wherein a center of the first viewport corresponds to a view angle of a viewer relative to the first spherical image.

15. The method of claim 13, wherein the first pixel values in the first viewport of the first spherical image are transformed by the one or more image processing operations.

16. An apparatus comprising one or more computing processors and configured to perform the method as recited in claim 1.

17. An apparatus comprising one or more computing processors and configured to perform the method as recited in claim 13.

18. A non-transitory computer-readable storage medium having stored thereon computer-executable instruction for executing, with one or more processors, the method as recited in claim 1.

19. A non-transitory computer-readable storage medium having stored thereon computer-executable instruction for executing, with one or more processors, the method as recited in claim 13.

* * * * *